(12) United States Patent
Khosrowshahi et al.

(10) Patent No.: US 12,255,865 B2
(45) Date of Patent: Mar. 18, 2025

(54) OBJECT INTERFACE FOR QUICK ACCESS TO OBJECTS OF A COMMUNICATION PLATFORM

(71) Applicant: Salesforce, Inc., San Francisco, CA (US)

(72) Inventors: Farzad Khosrowshahi, Weehawken, NJ (US); Issac Gerges, Austin, TX (US); Raja Jamwal, Pune (IN); Madhu Balakrishna, Sagar (IN); Rohan Venapusala, Roseville, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/971,409

(22) Filed: Oct. 21, 2022

(65) Prior Publication Data

US 2023/0179562 A1   Jun. 8, 2023

Related U.S. Application Data

(63) Continuation of application No. 17/240,000, filed on Apr. 26, 2021, now Pat. No. 11,522,825.

(30) Foreign Application Priority Data

Mar. 12, 2021   (IN) .............................. 202121010591

(51) Int. Cl.
  *H04L 51/224*   (2022.01)
  *G06F 3/04842*  (2022.01)
  (Continued)

(52) U.S. Cl.
  CPC .......... *H04L 51/52* (2022.05); *G06F 3/04842* (2013.01); *H04L 51/224* (2022.05); *H04L 67/02* (2013.01)

(58) Field of Classification Search
  CPC ... G06F 3/04842; H04L 51/224; H04L 51/52; H04L 67/02; H04L 67/53
  See application file for complete search history.

(56) References Cited

U.S. PATENT DOCUMENTS 9,996,236 B1 * 6/2018 Spencer-Harper ...... G06F 16/26
2002/0101997 A1 * 8/2002 Curtis ................. H04L 63/0428
                                                    380/279

(Continued)

OTHER PUBLICATIONS

U.S. Appl. No. 16/993,859, filed Aug. 14, 2020, Butterfield, et al., "Electronic Board Associated With a Communication Platform", 45 pages.

(Continued)

*Primary Examiner* — Jason D Recek
(74) *Attorney, Agent, or Firm* — Lee & Hayes, P.C.

(57) ABSTRACT

An object interface for quick access to object(s) of a communication platform is described. Server(s) of the communication platform can receive, in association with a user interface of the communication platform, a request to associate an object with an object interface associated with a virtual space of the communication platform. The server(s) can cause one or more objects to be presented via the user interface and can receive a selection of a particular object from the one or more objects. The server(s) can cause, in response to the selection, a user interface element representative of the particular object to be associated with the object interface, wherein the user interface element is associated with an actuation mechanism that, when actuated, causes the particular object to be presented via the user interface. Notifications associated with the particular object can be indicated by annotation(s) to the user interface.

20 Claims, 19 Drawing Sheets

(51) Int. Cl.
  *H04L 51/52* (2022.01)
  *H04L 67/02* (2022.01)

(56) References Cited

U.S. PATENT DOCUMENTS

| | | | | |
|---|---|---|---|---|
| 2003/0196052 | A1* | 10/2003 | Bolik | G06F 11/1448 |
| | | | | 714/E11.121 |
| 2009/0083314 | A1* | 3/2009 | Maim | G06F 40/194 |
| 2014/0331149 | A1 | 11/2014 | Abey | |
| 2015/0256501 | A1* | 9/2015 | Labey | H04L 67/00 |
| | | | | 715/848 |
| 2017/0195266 | A1 | 7/2017 | Moyers | |
| 2017/0329467 | A1 | 11/2017 | Chen et al. | |
| 2018/0096507 | A1* | 4/2018 | Valdivia | G06F 3/04842 |
| 2018/0287982 | A1 | 10/2018 | Draeger et al. | |
| 2022/0294756 | A1 | 9/2022 | Khosrowshahi et al. | |

OTHER PUBLICATIONS

U.S. Appl. No. 17/111,408, filed Dec. 3, 2020, Khosrowshahi, "Integrating a Third-Party Platform Into a Communication Platform", 53 pages.
U.S. Appl. No. 17/163,017, filed Jan. 29, 2021, McCue, et al., "Utilizing Message Metadata for Improving User Interface Presentation", 72 pages.
David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.
Bacchus, "How to rearrange items and pins in the Microsoft Team sidebar for a more custom look", May 4, 2020, retrieved at <<https://www.onmsft.com/how-to/how-to-rearrange-pins-sidebar-microsoft-teams>>, 14 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims to Cut us all Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/? context=1000516, (dated Feb. 12, 2014, 7:03 PM), 3 pages.
Internet Relay Chat, Wikipedia, [online][retrieved May 30, 2019]. Retrieved from the Internet: <URL: https://en.wikipedia.org/wiki/Internet_Relay_Chat> (dated May 28, 2019) 21 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516> (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", Fujitsu Sci. Tech. J., 36, 2, (Dec. 2000) pp. 154-161.
Office Action for U.S. Appl. No. 17/240,000, mailed on Oct. 4, 2021, Khosrowshahi, "Object Interface for Quick Access to Objects of a Communication Platform", 12 Pages.
Office Action for U.S. Appl. No. 17/240,000, mailed on Apr. 13, 2022, Khosrowshahi, "Object Interface for Quick Access to Objects of a Communication Platform", 10 pages.
Office Action for U.S. Appl. No. 17/240,000, mailed on Jul. 8, 2021, Khosrowshahi, "Object Interface for Quick Access to Objects of a Communication Platform", 10 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 3 pages.
PCT International Preliminary Report on Patentability mailed Sep. 21, 2023 for PCT Application No. PCT/US22/19678, 10 pages.

\* cited by examiner

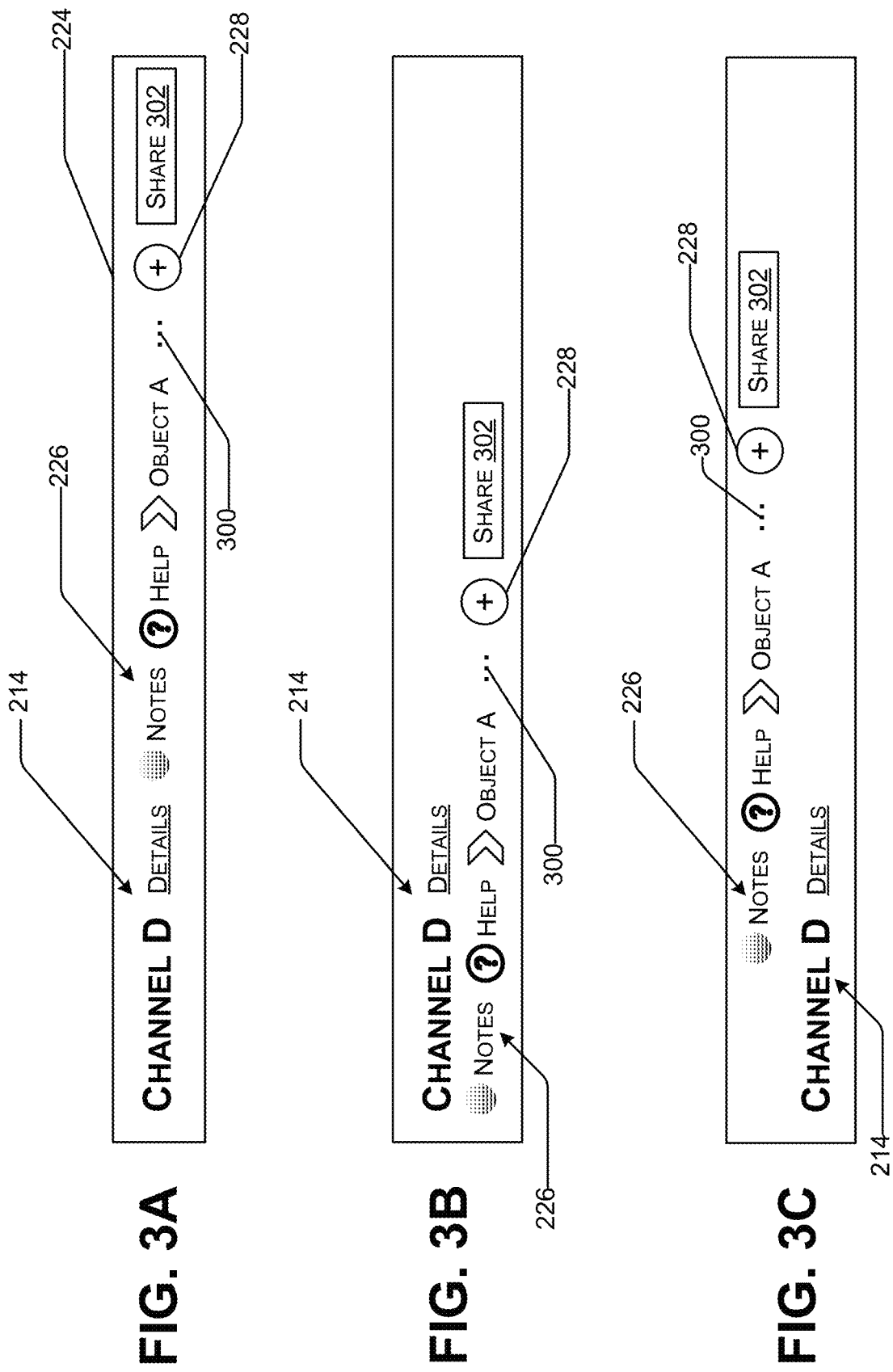

OBJECT INTERFACE FOR QUICK ACCESS TO OBJECTS OF A COMMUNICATION PLATFORM

RELATED APPLICATIONS

This application claims priority to and is a continuation of U.S. patent application Ser. No. 17/240,000, filed Apr. 26, 2021, which claims priority to Indian patent application No. 202121010591, filed on Mar. 12, 2021, which is now abandoned, the entire contents of which are incorporated herein by reference.

TECHNICAL FIELD

A communication platform can leverage a network-based computing system to enable users to exchange data for communication and/or collaboration. In some examples, users can exchange messages via the communication platform. In some examples, applications associated with third-party platforms (e.g., third-party applications) can be integrated into the communication platform and can be used by users for communicating via the communication platform, performing actions in association with the communication platform, and/or otherwise providing data to the communication platform. As such, users and/or applications can generate data that can be presented via a user interface of the communication platform.

In some examples, the user interface can present a data feed indicating messages posted to and/or actions taken with respect to a particular channel, direct message, or the like. In existing techniques, the user interface can be cluttered and overwhelming to users. In existing techniques, the user interface can require users to scroll and/or otherwise navigate through data—from users, applications, and/or the like—to understand context of the communication and effectively utilize the communication platform. In some examples, users can miss important messages due to the amount of data they are required to scroll and/or otherwise navigate through. Further, this scrolling and/or other navigation can cause poor user experiences and can be inefficient.

BRIEF DESCRIPTION OF THE DRAWINGS

The detailed description is described with reference to the accompanying figures. In the figures, the leftmost digit of a reference number identifies the figure in which the reference number first appears. The use of the same reference numbers in different figures indicates similar or identical components or features. The figures are not drawn to scale.

FIGS. 3A-3C illustrate examples of an object interface that can be presented via a user interface of a communication platform, as described herein.

DETAILED DESCRIPTION

Figure 1:
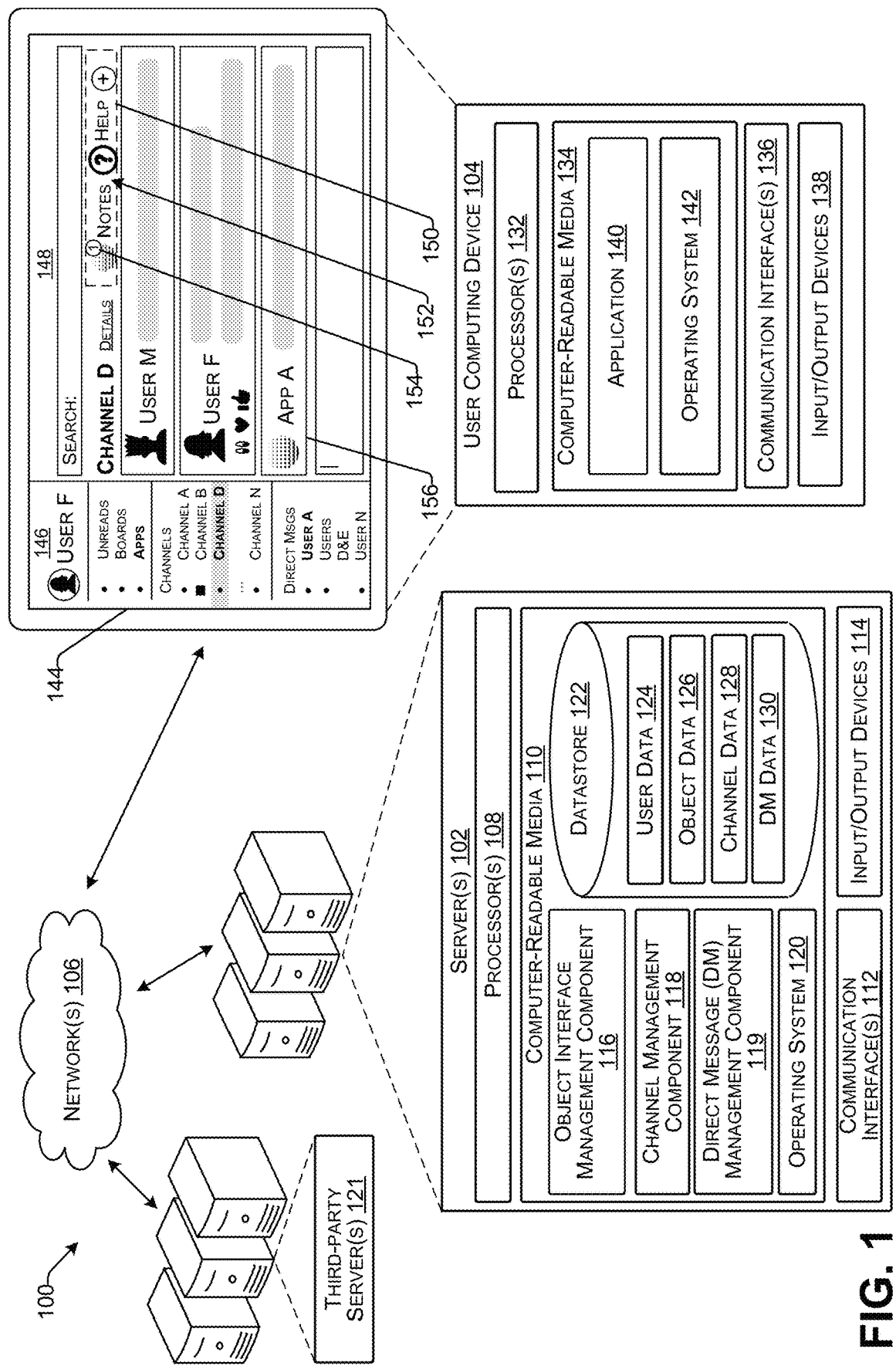
FIG. 1 illustrates an example environment for performing techniques described herein.

An object interface for quick access to objects of a communication platform is described. A communication platform, which, in some examples can be a group-based communication platform, a channel-based communication platform, a permission-based communication platform, channel-based messaging platform, and/or any other platform for facilitating communication between and among users, can enable users to exchange messages via the communication platform. Users can exchange messages or otherwise collaborate via channels, direct messages, and/or other virtual spaces. That is, such virtual spaces enable users to exchange messages (e.g., converse), share other information or data (e.g., files, images, etc.), interact with and/or otherwise utilize applications and/or workflows, and/or otherwise collaborate with one another. In existing techniques, data associated with such virtual spaces can be presented based on recency of interaction. That is, the priority and hierarchy of such data can be determined based on recency of interaction. However, not all data associated with such virtual spaces is of equal importance and, in some examples, recency of interaction is inadequate for determining priority, hierarchy, and/or other arrangements for presenting information to users. The object interface described herein enables users of the communication platform to prioritize the information assets, applications, workflows, and/or other objects that are important for quick access. That is, techniques described herein relate to an object interface that enables users to prioritize objects that are useful when collaborating such that they are omnipresent on a user interface of the communication platform.

Techniques described herein relate to "pinning" or otherwise associating objects—or quick links to objects—to an object interface associated with a user interface of the communication platform. For the purpose of this discussion, an object can be text, an image, a video, a snippet of content, a user profile, a message, a file, a channel, a direct message, a board, a virtual space, an invitation, a sign-in request, a workflow, an application, and/or any other data item. In some examples, an object can be a "first-party object," which can be associated with the communication platform. That is, the communication platform can be a "first-party platform." In some examples, an object can be a "third-party object," such that the object is associated with a "third-party platform." A third-party platform can be external to the first-party platform (e.g., a different entity or organization, outside the control or authority of the first-party platform, etc.). In at least one example, a third-party platform can host, store, manage, or otherwise own one or more objects. That is, an object created by a third-party platform can be a "third-party object" and can be hosted, stored, managed, or otherwise owned by the third-party platform. In at least one example, a third-party object can be integrated in the communication platform such that the third-party object can be accessed from within the communication platform. In at least one example, a user can request to access a third-party object from a user interface of the communication platform. The third-party object can be retrieved from the third-party platform and presented via the user interface, such that the user can view, edit, or otherwise interact with the third-party object via the user interface.

In at least one example, an object interface can utilize "quick links" or other mechanisms to enable quick access to objects associated with the object interface. In some examples, the object interface can comprise one or more user interface elements that each represent one or more objects. In some examples, individual user interface elements can represent individual objects. In some examples, individual user interface elements can be associated with individual actuation mechanisms, such as links. Based at least in part on determining that a link has been actuated, computing device(s) associated with the communication platform can receive an indication that the link has been actuated, retrieve the corresponding object, and cause the corresponding object to be presented via the user interface of the communication platform.

In some examples, a user interface element associated with the object interface can be associated with one or more objects. In such examples, actuation of or interaction with such a user interface element can cause one or more additional user interface elements, representative of one or more objects, respectively, to be presented via the user interface. In such examples, the one or more user interface elements can be associated with one or more actuation mechanisms, such as one or more links, that can enable a user to access the one or more objects via the computing device(s) associated with the communication platform. That is, in some examples, objects associated with a same application, topic, user, date, time, or other common characteristic can, in some examples, be represented by a single object in the object user interface such that interaction with the single object (e.g., an actuation mechanism associated therewith) can enable access to one or more objects.

Techniques described herein enable users to have quick access to recent objects (e.g., object(s) accessed within a threshold period of time of a current system time) and/or relevant objects (e.g., object(s) that are associated with a relevance metric above a threshold) associated with the communication platform which can provide a technical improvement to existing techniques. As described above, in some examples, the user interface of the communication platform can present a data feed indicating messages posted to and/or actions taken with respect to a particular channel, direct message, or the like. In existing techniques, the user interface can be cluttered and overwhelming to users. In existing techniques, the user interface can require users to scroll and/or otherwise navigate through data—from users, applications, and/or the like—to understand context of the communication and effectively utilize the communication platform. In existing techniques, users can miss important messages due to the amount of data they are required to scroll and/or otherwise navigate through. In existing techniques, users can miss updates to objects due to the amount of data associated with the communication platform and the rate at which new data is received. Further, scrolling and/or other navigation can cause poor user experiences and can be inefficient.

The object interface described herein enables users to prioritize objects that are useful when collaborating such that they are omnipresent on a user interface of the communication platform. As such, users can quickly access objects that are important without having to scroll or otherwise navigate through data as described above. In some examples, as described herein, objects associated with the object interface can change over time (e.g., dynamically) based on interactions with virtual spaces of the communication and/or user interactions (e.g., what has been done/used recently and/or what is currently relevant). This can enable prioritization of objects that are recent and/or relevant for quick access for users. That is, the object interface described herein can provide an improved user experience and improved user efficiency in interacting with user interfaces as described herein.

Moreover, as described herein, techniques can enable notifications relating to modifications or other updates to objects to be presented via the user interface, for example, in association with the object interface or in a feed of a virtual space with which the object interface is associated. As such, users can be alerted of updates to objects quickly and efficiently without having to navigate away from the user interface and/or communication platform and/or otherwise scroll or navigate through data as described herein. Thus, techniques described herein can provide an improved user experience and improved user efficiency in interacting with user interfaces as described herein.

Further, in some examples, techniques described herein can reduce the number of inputs required to accomplish a task (e.g., when a single object in the object interface is associated with multiple objects and thus can launch multiple actions), thereby improving performance of user computing devices as descried herein. That is, as described herein, techniques described offer improvements to existing technology.

FIG. 1 illustrates an example environment 100 for performing techniques described herein. In at least one example, the example environment 100 can include one or more server computing devices (or "server(s)") 102. In at least one example, the server(s) 102 can include one or more servers or other types of computing devices that can be embodied in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can be associated with a communication platform that can leverage a network-based computing system to enable users of the communication platform to exchange data. In at least one example, the communication platform can be "group-based" such that the platform, and associated systems, channels, messages, and/or virtual spaces, have security (that can be defined by permissions) to limit access to defined groups of users. In some examples, such groups of users can be defined by identifiers, which can be associated with common access credentials, domains, or the like. In some examples, the communication platform can be a hub, offering a secure and private virtual space to enable users to chat, meet, call, collaborate, transfer files or other data, message, or otherwise communicate between or among each other.

In some examples, each group can be associated with an organization, which can be associated with an organization identifier. Users associated with the organization identifier can chat, meet, call, collaborate, transfer files or other data, message, or otherwise communicate between or among each other in a secure and private virtual space available via the communication platform. In some examples, each group can be associated with a workspace, associated with a workspace identifier. Users associated with the workspace identifier can chat, meet, call, collaborate, transfer files or other data, message, or otherwise communicate between or among each other in a secure and private virtual space available via the communication platform. In some examples, a group can be associated with multiple organizations and/or workspaces. In some examples, a workspace can be associated with multiple organizations. In some examples, an organization can be associated with multiple workspaces.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like. In some examples, users can be associated with designated roles (e.g., administrator, team leader, etc.) and/or types (e.g., verified, etc.).

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include an object interface management component 116, a channel management component 118, a direct message management component 119, an operating system 120, and a datastore 122. In some examples, additional or alternative components can be stored in the computer-readable media, for managing additional or alternative objects associated with the communication platform. For instance, an application management component can manage applications and/or integrations thereof, a board management component can manage boards, as described herein, and/or the like.

In at least one example, the object interface management component 116 can manage the association of objects with object interfaces of user interfaces described herein. In at least one example, an object interface, as described above, can comprise one or more other user interface elements that represent one or more objects associated with the communication platform. As described above, an object interface can enable users to quickly access particular objects via interactions with the object interface. In at least one example, the object interface management component 116 can receive a request to associate an object with an object interface that is associated with a virtual space of the communication platform. In some examples, the virtual space can comprise a channel, a direct message, a board, or the like. As described above, an object can be text, an image, a video, a snippet of content, a user profile, a message, a file, a channel, a direct message, a board, a virtual space, an invitation, a sign-in request, an application, a workflow, and/or any other data item. In some examples, an object can be a first-party object or a third-party object. In some examples, a third-party object can be associated with the communication platform by the provision of a resource locator associated with the third-party object, a drag and drop action associated with the third-party object (e.g., dragging the third-party object from the third-party resource to the communication platform), uploading the third-party object from a storage repository, and/or the like. In some examples, third-party objects that can be associated with the communication can be determined by permission(s) provided by an administrator or the like. Additional details associated with the integration of third-party platforms with the communication platform are described with reference to U.S. patent application Ser. No. 17/111,408, filed on Dec. 3, 2020, the entire contents of which are incorporated by reference herein.

In at least one example, based at least in part on receiving a request to associate an object with an object interface, the object interface management component 116 can associate the object with the object interface and cause a user interface element representative of the object to be presented in the object interface. In some examples, if an object is not identified with a request, the object interface management component 116 can cause one or more objects to be presented via a user interface for selection (e.g., an object selection user interface). In some examples, the one or more objects presented for selection can be determined to be relevant to a user, a virtual space, or the like. Additional details are described below. Based at least in part on receiving a selection of an object of the one or more objects, the object interface management component 116 can associate the object with the object interface and cause a user interface element representative of the object to be presented in the object interface. In at least one example, the object interface management component 116 can cause the user interface element representative of the object to be presented via each instance of the user interface presented via user computing devices of users associated with the virtual space. For example, if the virtual space is a channel, instances of the user interface presented to each member of the channel can be updated to include the user interface element representative of the object in the object interface associated with the channel. In some examples, such an update can be pushed to the user computing devices in real-time, or within a threshold amount of time of when the request to associate the object with the object interface is received.

In some examples, the communication platform can provide application programming interface(s) (API(s)) for third-party platform(s) (e.g., associated with the third-party server(s) 121) to integrate with the communication platform. As described above, a third-party platform, which can be associated with the third-party server(s) 121, can be external to the communication platform and can offer additional or alternative services than those offered by the communication platform. In an example, services of a third-party platform can be accessed via a third-party application, a web browser, or the like. In at least one example, a third-party platform can host, store, manage, or otherwise own one or more objects. As described above, an object created by a third-party platform can be a "third-party object" and can be hosted, stored, managed, or otherwise owned by the third-party platform. In some examples, the API(s) provided by the communication platform can enable the third-party platform(s) to enable interaction between the third-party platform(s) and the communication platform, for example, with respect to notifications.

In at least one example, based at least in part on receiving a notification associated with an object (e.g., via the API(s) or otherwise), the object interface management component 116 can annotate the user interface. For instance, in at least one example, the object interface management component 116 can cause a new user interface element (e.g., a badge or the like) to be associated with the user interface element representative of the object in the object interface. In at least one example, the object interface management component 116 can cause a new message to be presented in a data feed associated with a virtual space with which the object interface is associated. In some examples, the object interface management component 116 can cause a pop-up, overlay, or other user interface element to be presented via the user interface in response to receiving a notification or other indication of an update to an object. In some examples, such a pop-up, overlay, or other user interface element can be ephemeral (e.g., short-lived or transitory).

In at least one example, user interface elements representative of objects that are associated with the object interface can be associated with actuation mechanisms, such as links. In some examples, actuation of an actuation mechanism can cause the object to be presented via the user interface of the communication platform. In some examples, the object interface management component 116 can receive an indication of a selection and can retrieve the object (e.g., from within the communication platform or via an API connection to a third-party platform). The object interface management component 116 can then cause the object to be presented via the user interface of the communication platform. In some examples, an object can be presented in a new user interface associated with a third-party platform. Additional details are provided below.

In some examples, object interfaces and object(s) associated therewith can be sharable with other users of the communication platform. As described below, in some examples, an object interface can be associated with an actuation mechanism that, when actuated, can enable the object interface, and object(s) associated therewith, to be shared to other virtual spaces, other groups of users, and/or the like. For instance, a user in a first channel can share an object interface associated with the first channel with a second channel. As such, the first channel and the second channel can be associated with the same object interface and members of both channels can access the object interface and object(s) associated therewith. In some examples, such access, however, can be determined based at least in part on permission(s) associated with such object(s) and/or user(s).

In some examples, as described below, an administrator can configure object interface templates for groups of users and/or types of virtual spaces, for example, programmatically. An administrator can be a user who has permissions that enable the user to perform operations and/or otherwise configure aspects of the communication platform for groups of users for which the user is an administrator. In some examples, the object interface management component 116 can cause an administrator user interface to be presented via a user interface associated with the communication platform. In at least one example, the administrator can interact with the administrator user interface to designate objects that are to be associated with an object interface for particular groups of users (e.g., workspaces, organizations, etc.) and/or types of virtual spaces (e.g., public channels, private channels, announcement channels, shared channels, direct messages, boards, etc.). Such configured object interfaces can comprise "templates" and can be stored in the datastore 122, as described below. Additional examples are provided below.

In at least one example, the channel management component 118 can manage channels of the communication platform. In at least one example, the communication platform can be "channel-based" such that the platform can be organized into channels having security (that can be defined by permissions) to limit access to defined groups of users (e.g., members of the channels). A channel, or virtual space, can be a data route used for exchanging data between and among systems and devices associated with the communication platform. In some examples, a channel may be "public," which may allow any user within a group (e.g., associated with an organization identifier, associated with a workspace identifier, etc.) with which the channel is associated to join and participate in the data sharing through the channel. In some examples, a channel may be "private," which may restrict data communications in the channel to certain users or users having particular roles (e.g., managers, administrators, etc.) and/or types (e.g., verified, etc.). An announcement channel can comprise a channel in which users can post announcements.

In some examples, a channel may be "shared," which may allow users associated with two or more different groups (e.g., entities associated with two or more different organization and/or workspace identifiers) to join and participate in the data sharing through the channel. A shared channel may be public such that it is accessible to any user of groups associated with the shared channel, or may be private such that it is restricted to access by certain users or users having particular roles and/or types. A "shared channel" or an "externally shared channel" can enable two or more organizations, such as a first organization and a second organization to share data, exchange communications, and the like. In an example, the first organization and the second organization can be associated with different organization identifiers, can be associated with different business entities, have different tax identification numbers, and/or otherwise can be associated with different permissions such that users associated with the first organization and users associated with the second organization are not able to access data associated with the other organization, without the establishment of an externally shared channel. In some examples, a shared channel can be shared with one or more different workspaces and/or organizations that, without having a shared communication, would not otherwise have access to each other's data by the nature of the permission-based and/or group-based configuration of the communication platform described herein.

In at least one example, the channel management component 118 can receive a request to generate a channel. In some examples, the request can include a name that is to be associated with the channel, one or more users to invite to join the channel, and/or permissions associated with the channel. In at least one example, one or more user identifiers associated with one or more users and/or one or more user accounts can be mapped to, or otherwise associated with, a channel (e.g., a channel identifier associated therewith). User(s) associated with a channel can be "members" of the channel. Members of a channel can communicate with other members via the channel. That is, in at least one example, the channel management component 118 can establish a channel between and among various user computing devices associated with user identifiers associated with the channel, allowing the user computing devices to communicate and share data between and among each other. As described herein, in some examples, such communication and/or sharing of data can be via one or more messages that can be exchanged via a channel. In at least one example, the channel management component 118 can manage such communications and/or sharing of data. In some examples, data associated with a channel can be presented via a user interface.

As described above, in at least one example, one or more permissions can be mapped to, or otherwise associated with, a channel and/or members associated therewith. Such permission(s) can indicate which user(s) have permission to access the channel, actions and/or messages permitted in the channel, which user(s) and/or type(s) of users are permitted to add or remove members, which user(s) and/or types of users are permitted to share the channel with other users, a retention policy associated with data in the channel, whether the channel is public or private, or the like.

In at least one example, the direct message management component 119 can manage "direct messages," which can comprise communications with individual users or multiple specified users (e.g., instead of all, or a subset of, members of an organization). In at least one example, a "direct message" can comprise a data route, or virtual space, used for exchanging data between and among systems and devices associated with the communication platform. In some examples, a direct message can be a private message between two or more users of the communication platform. In some examples, a direct message may be "shared," which may allow users associated with two or more different groups (e.g., entities associated with two or more different organization and/or workspace identifiers) to join and participate in the data sharing through the direct message.

In at least one example, the direct message management component 119 can receive a request to generate a direct message. In some examples, the request can include identifiers associated with one or more users that are intended recipient(s) of the direct message. In at least one example, one or more user identifiers associated with one or more users and/or one or more user accounts can be mapped to, or otherwise associated with, a direct message (e.g., or direct message identifier associated therewith). User(s) associated with a direct message can communicate with one another and/or otherwise share data with one another via the direct message. As described herein, in some examples, such communication and/or sharing of data can be via one or more messages that can be exchanged via the direct message. In at least one example, the direct message management component 119 can manage such communications and/or sharing of data. In some examples, data associated with a direct message can be presented via a user interface.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise one or multiple databases, which can include user data 124, object data 126, channel data 128, and direct message (DM) data 130. Additional or alternative data may be stored in the datastore and/or one or more other datastores.

In at least one example, the user data 124 can store data associated with users of the communication platform. In at least one example, the user data 124 can store data in user profiles (which can also be referred to as "user accounts"), which can store data associated with a user, including, but not limited to, one or more user identifiers associated with multiple, different organizations, groups, or entities with which the user is associated, one or more channel identifiers associated with channels to which the user has been granted access, one or more group identifiers for groups (or, organizations, teams, entities, or the like) with which the user is associated, an indication whether the user is an owner or manager of any channels, an indication whether the user has any channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like. In some examples, the user data 124 can store indications of subscription(s) with which individual users are associated.

In at least one example, the user data 124 can include permission data indicative of permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, a profile and/or account associated with the user data 124. In some examples, permissions can indicate which users can communicate directly with other users, which channels a user is permitted to access, restrictions on individual channels, which workspaces the user is permitted to access, restrictions on individual workspaces, restrictions on subscriptions, permitted features of subscriptions, and the like. In at least one example, the permissions can support the communication platform by maintaining security for limiting access to a defined group of users. In some examples, such users can be defined by common access credentials, group identifiers, or the like, as described above.

In some examples, the datastore 122 can store permission data associated with permissions of groups associated with the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group. In some examples, permissions can indicate restrictions on individual groups, restrictions on channel(s) associated with individual groups, restrictions on user(s) associated with individual groups, and the like. In at least one example, group permissions can be mapped to, or otherwise associated with, user profiles associated with such groups.

In at least one example, the object data 126 can store data associated with objects. In some examples, each object can be associated with an indication of an "owner" of the object (e.g., a platform and/or application storing and/or serving notifications associated therewith), at least one of a user identifier, a group identifier, a channel identifier, a direct message identifier, a board identifier, or the like associated with the object, object interface(s) with which the object is associated (e.g., object interface identifier(s) associated therewith), a resource locator associated with the object, notification data (e.g., frequency, priority, presentation preferences, etc.), etc. In some examples, an authorization indicator (e.g., a flag, token, etc.) can be associated with an object, thereby indicating that the object is authorized for access by a particular user, group of users, virtual space, etc. In some examples, an authentication indicator (e.g., a token, etc.) can be associated with an object, thereby indicating that a particular user and/or user computing device is authenticated (e.g., by a third-party platform) for receiving notifications associated with the object.

In some examples, the object data 126 can store indications of which third-party platforms can be integrated into the communication platform for particular users, groups (e.g., organizations, workspaces), channels, direct messages, and/or the like. In some examples, such object data 126 can be set by administrators or other users having particular roles associated with the ability to set permissions.

In at least one example, the channel data 128 can store data associated with individual channels. In at least one example, the channel management component 118 can establish a channel between and among various user computing devices, allowing the user computing devices to communicate and share data between and among each other. In at least one example, a channel identifier may be assigned to a channel, which indicates the physical address in the channel data 128 where data related to that channel is stored.

In some examples, the channel data 128 can store data associated with permissions of individual channels. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a channel can be mapped to, or otherwise associated with, data associated with the channel in the channel data 128. In some examples, permissions can indicate restrictions on individual channels, restrictions on user(s) associated with individual channels, and the like.

In some examples, the channel data 128 can store indications of object(s) associated with particular channels and/or object interface(s) associated therewith.

In at least one example, the DM data 130 can store data associated with individual direct messages. In at least one example, the direct message management component 119 can establish a direct message between and among various user computing devices, allowing the user computing devices to communicate and share data between and among each other via the direct message. In at least one example, a direct message identifier may be assigned to a direct message, which indicates the physical address in the DM data 130 where data related to that direct message is stored. In some examples, the DM data 130 can store indications of objects(s) associated with particular direct messages and/or object interface(s) associated therewith.

In some examples, the datastore 122 can be partitioned into discrete items of data that may be accessed and managed individually (e.g., data shards). Data shards can optimize the effiency in which technical tasks may be performed, such as data retention, accessing data, and integration settings. In some examples, data shards can be associated with groups (e.g., organizations, workspaces), channels, direct messages, users, or the like.

In some examples, individual groups can be associated with a database shard within the datastore 122 that stores data related to a particular group identification. For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored. In some examples, a database shard can store data related to two or more groups (e.g., as in a shared channel).

In some examples, a channel can be associated with a database shard within the datastore 122 that stores data related to a particular channel identification. For example, a database shard may store electronic communication data associated with the channel, which enables members of that particular channel to communicate and exchange data with other members of the same channel in real time or near-real time. In this example, a group or organization can be the owner of the database shard and can control where and how the related data is stored.

In some examples, a direct message can be associated with a database shard within the datastore 122 that stores data related to a particular direct message identification. For example, a database shard may store electronic communication data associated with the direct message, which enables a user associated with a particular direct message to communicate and exchange data with other users associated with the same direct message in real time or near-real time. In this example, a group or organization can be the owner of the database shard and can control where and how the related data is stored.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Web sockets, Application Programming Interfaces (APIs) (e.g., using API calls), HyperText Transfer Protocols (HTTPs), etc. In some examples, communication interface(s) 112 can facilitate real-time text (RTT) such that text and/or other data can be transmitted instantly, or substantially instantly, as it is typed or created.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In at least one example, the application 140 can be a native application associated with the communication platform. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein, which in some examples can be rendered based at least in part on instructions received from the server(s) 102. In at least one example, a user can interact with the user interfaces via touch input, keyboard input, mouse input, spoken input, or any other type of input. Additional or alternative access points, such as a web browser, can be used to enable the user computing device 104 to interact with the server(s) 102 as described herein. That is, in examples where the application 140 is described as performing an operation below, in an additional or alternative example, such an operation can be performed by another access point, such as a web browser or the like.

A non-limiting example of a user interface 144 is shown in FIG. 1. As illustrated in FIG. 1, the user interface 144 can present data associated with one or more channels, direct messages, and/or other virtual spaces associated with the communication platform. In some examples, the user interface 144 can include a first section 146 (e.g., which can be a portion, pane, or other partitioned unit of the user interface 144), that includes user interface element(s) representing channel(s), direct message(s), and/or other virtual space(s) (e.g., boards, etc.) with which the user (e.g., account of the user) is associated. Additional details associated with the first section 146 and associated indications(s) are described below with reference to FIG. 2.

In at least one example, the user interface 144 can include a second section 148 (e.g., which can be a portion, pane, or other partitioned unit of the user interface 144) that can present data associated with virtual spaces as described herein. In some examples, the second section 148 can be associated with a data feed (or, "feed") indicating messages posted to and/or actions taken with respect to one or more channels and/or other virtual spaces for facilitating communications (e.g., a virtual space associated with direct message communication(s), a virtual space associated with event(s) and/or action(s), etc.) as described herein. In at least one example, data associated with the second section 148 can be associated with the same or different workspaces. That is, in some examples, the second section 148 can present data associated with the same or different workspaces via an integrated feed. In some examples, the data can be organized and/or is sortable by date, time (e.g., when associated data is posted or an associated operation is otherwise performed), type of action and/or data, workspace, channel, user, topic, relevance metric, and/or the like.

In some examples, such data can be associated with an indication of which user (e.g., member of the channel) and/or application posted a message or otherwise caused the message to be posted and/or performed an action. In examples where the second section 148 presents data associated with multiple workspaces, at least some data can be associated with an indication of which workspace the data is associated with.

In some examples, the second section 148 can be associated with a virtual space, such as a board, which can present data in a configuration different from a feed. Additional details associated with boards and/or such data presentation are described below. That is, the second section 148 can present additional or alternative data in additional or alternative configurations than are described with reference to FIG. 1.

In at least one example, the first section 146 and the second section 148, in combination, can be associated with a "group-based communication user interface" from which a user can interact with the communication platform. Additional details associated with the user interface 144, the first section 146, and the second section 148, are described below with reference to FIG. 2.

In at least one example, an object interface 150 can be associated with the user interface 144. In some examples, the object interface 150 can comprise a "bar," which can be positioned proximate a header or top of a virtual space. In some examples, the object interface 150 can be arranged along a side of the user interface 144. In some examples, the object interface 150 can be associated with a virtual space, such as a channel, a direct message, a board, and/or the like. In some examples, the object interface 150 can be associated with a header of the virtual space, which can provide information associated with the virtual space such as the name of the virtual space, members associated with the virtual space, a description of the virtual space, details associated with the virtual space, or the like. In at least one example, the object interface 150 can include one or more user interface elements 152 which can represent one or more objects associated with the object interface 150. Such objects, as described above, can be first-party or third-party objects. In some examples, the user interface element(s) 152 can be arranged in an order based at least in part on interaction data associated with the corresponding object(s). In some examples, the user interface element(s) 152 can be arranged in an order by a user.

In some examples, when an object is modified or otherwise interacted with, a new user interface element 154 can be presented in association with the user interface element representative of the object. In some examples, the new user interface element 154 can be a badge or the like. In some examples, such a new user interface element 154 can provide a real-time notification that the object has been modified or otherwise interacted with. In some examples, if a user interface element has already been associated with the user interface element (e.g., in response to a previous modification or interaction), a count associated with the user interface element can be updated instead of associating a new user interface element therewith. In some examples, a new message 156 can additionally or alternatively be presented in the data feed of the virtual space (e.g., the data feed of Channel D), which can provide a real-time notification that the object has been modified and/or otherwise interacted with. Additional details associated with the user interface 144 and the object interface 150 are described below with reference to FIGS. 2-5C.

In at least one example, the operating system 142 can manage the processor(s) 132, computer-readable media 134, hardware, software, etc. of the user computing device 104.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc. In some examples, communication interface(s) 136 can facilitate RTT such that text and/or other data can be transmitted instantly, or substantially instantly, as it is typed or created.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, connection ports and so forth.

While techniques described herein are described as being performed by the object interface management component 116, the channel management component 118, the direct message management component 119, and the application 140, techniques described herein can be performed by any other component, or combination of components, which can be associated with the server(s) 102, the user computing device 104, or a combination thereof.

Figure 2:
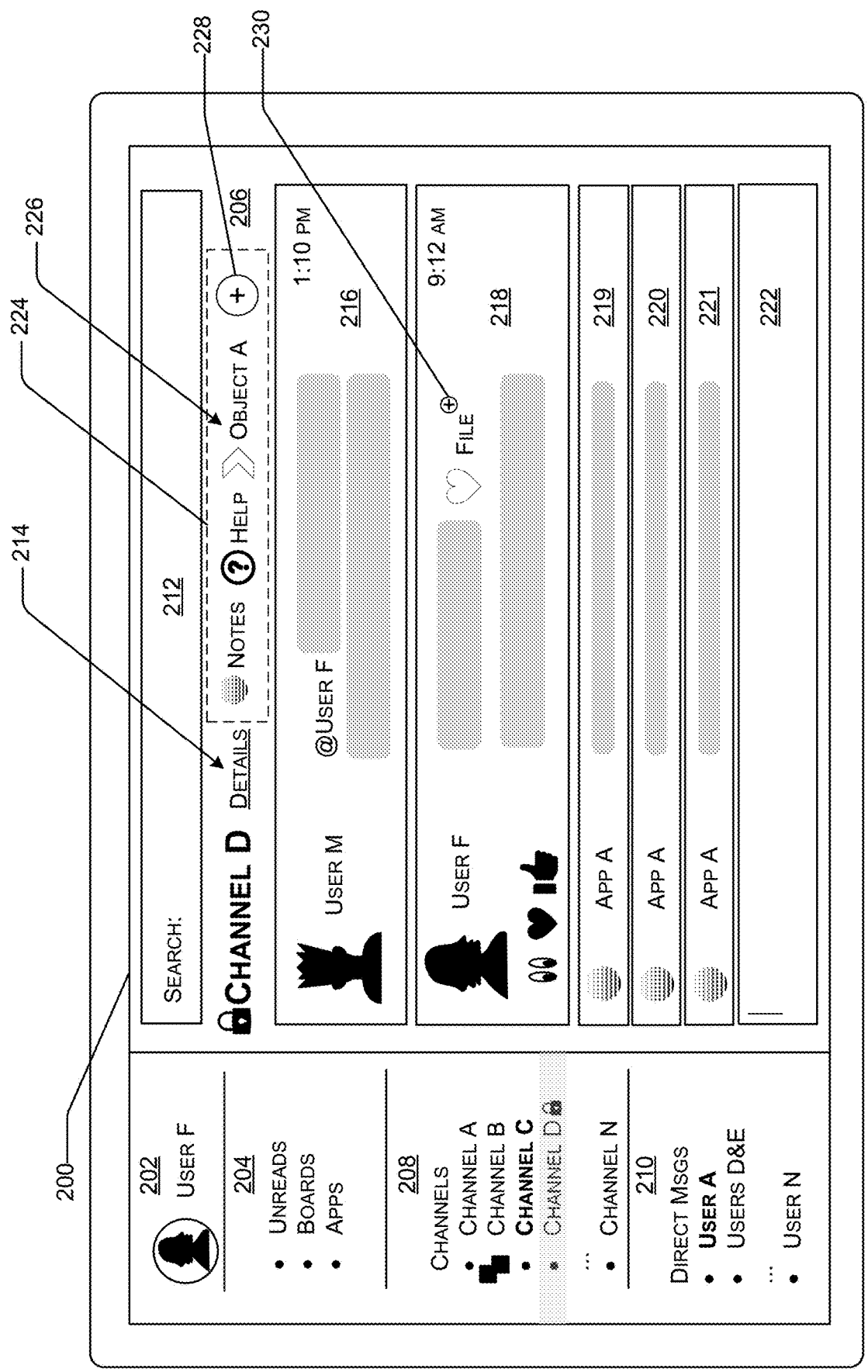
FIG. 2 illustrates an example of a user interface presented via a communication platform, as described herein.

FIG. 2 illustrates an example user interface 200 presented via a communication platform, as described herein. The user interface 200 can correspond to the user interface 144 described above with reference to FIG. 1. As described above, in some examples, a user interface 200 presented via the communication platform can include a first section 202 (which can correspond to the first section 146 described above with reference to FIG. 1) that includes user interface element(s) representing virtual space(s) with which the user (e.g., account of the user) is associated. In at least one example, the first section 202 can include one or more subsections, which can include user interface element(s) representative of different virtual spaces. For example, a first subsection 204 can include user interface elements representing virtual spaces that can aggregate data associated with a plurality of channels and/or workspaces. In at least one example, each virtual space can be associated with a user interface element in the first subsection 204. In some examples, a user interface element can be associated with an actuation mechanism, that when actuated, can cause the application 140 to present data associated with the corresponding virtual space via a second section 206 of the user interface 200 (which can correspond to the second section 148 described above with reference to FIG. 1).

In at least one example, a virtual space can be associated with all unread data associated with one or more of the workspaces with which the user is associated. That is, in some examples, if the user requests to access the virtual space associated with "unreads," all data that has not been read (e.g., viewed) by the user can be presented in the second section 206, for example in a data feed or other configuration.

In another example, a virtual space can be associated with "boards" with which the user is associated. In at least one example, if the user requests to access the virtual space associated with "boards," one or more boards with which the user is associated can be presented via the user interface 200.

In at least one example, boards, as described herein, can be associated with individual groups and/or channels to enable users of the communication platform to create, interact with, and/or view data associated with such boards. That is, a board, which can be an "electronic board," can be a virtual space, canvas, page, or the like for collaborative communication and/or organization within the communication platform. In at least one example, a board can support editable text and/or objects that can be ordered, added, deleted, modified, and/or the like. In some examples, a board can be associated with permissions defining which users of a communication platform can view and/or edit the board. In some examples, a board can be associated with a channel and at least some members of the channel can view and/or edit the board. In some examples, a board can be sharable such that data associated with the board is accessible to and/or interactable for members of the multiple channels, workspaces, organizations, and/or the like.

In at least one example, a board can include section(s) and/or object(s). In some examples, each section can include one or more objects. In at least one example, an object can be associated with an object type, which can include, but is not limited to, text (e.g., which can be editable), a task, an event, an image, a graphic, a link to a local object, a link to a remote object, a file, and/or the like. In some examples, the sections and/or objects can be reordered and/or otherwise rearranged, new sections and/or objects can be added or removed, and/or data associated with such sections and/or objects can be edited and/or modified. That is, boards can be created and/or modified for various uses. That is, users can customize and/or personalize boards to serve individual needs as described herein. As an example, sections and/or objects can be arranged to create a project board that can be used to generate and/or assign tasks, track progress, and/or otherwise manage a project. Further, in some examples, boards can present company metrics and also enable access to company goals so that such information can be stored and/or accessed via a single location. In some examples, boards can be used to keep track of work progress and/or career growth, which can be used by managers or supervisors for managing and/or supervising employees, agents, and/or other workers. In at least one example, a board can be used to track incidents, incoming customer service requests, and/or the like. Additional details associated with boards are provided in U.S. patent application Ser. No. 16/993,859, filed on Aug. 14, 2020, the entire contents of which are incorporated by reference herein.

In at least one example, "apps" can be associated with applications that are integrated with the communication platform and accessible to the user (e.g., based on permission data). In some examples, if the user requests to access the virtual space associated with "apps," one or more indications of one or more applications that are integrated with and accessible to the user can be presented via the user interface 200.

In another example, although not shown in FIG. 2, the first subsection 204 can include a user interface element associated with "threads," which can be associated with messages, files, etc. posted in threads to messages posted in a channel, and/or "mentions and reactions," which can be associated with messages or threads where the user (e.g., User F) has been mentioned (e.g., via a tag) or another user has reacted (e.g., via an emoji, reaction, or the like) to a message or thread posted by the user. In some examples, the first subsection 204 can be associated with a user interface element representing "snippets of content," which can be associated with snippets of audio and/or video content provided by users associated with the communication platform.

In some examples, data associated with the various virtual spaces described above can be organized and/or sortable, when presented in the second section 206, by date, time (e.g., when associated data is posted or an associated operation is otherwise performed), type of action and/or data, workspace, channel, user, topic, relevance metric, and/or the like. In some examples, such data can be associated with an indication of which user (e.g., member of the channel) and/or application posted the message, performed an action, and/or the like. Additional details are described below.

In at least one example, the first section 202 of the user interface 200 can include a second subsection 208 that includes user interface elements representing channels. In some examples, the channels can include public channels, private channels, announcement channels, shared channels (e.g., between organizations), single workspace channels, cross-workspace channels, combinations of the foregoing, or the like. In some examples, the channels represented can be associated with a single workspace. In some examples, the channels represented can be associated with different workspaces (e.g., cross-workspace). In some examples, the channels represented can be associated with combinations of channels associated with a single workspace and channels associated with different workspaces.

In some examples, the second subsection 208 can depict all channels, or a subset of all channels, that the user has permission to access (e.g., as determined by the user data 124). In such examples, the channels can be arranged alphabetically, based on most recent interaction, based on frequency of interactions, based on channel type (e.g., public, private, shared, cross-workspace, etc.), based on workspace, in user-designated sections, or the like. In some examples, the second subsection 208 can depict all channels, or a subset of all channels, that the user is a member of, and the user can interact with the user interface 200 to browse or view other channels that the user is not a member of but are not currently displayed in the second subsection 208. In some examples, different types of channels (e.g., public, private, shared, etc.) can be in different sections of the second subsection 208, or can have their own subsections in the user interface 200. In some examples, channels associated with different workspaces can be in different portions of the second subsection 208, or can have their own sections or subsections in the user interface 200.

In some examples, the user interface elements representing channels can be associated with additional or alternative user interface elements that visually differentiate types of channels. For example, the user interface element representing Channel B is associated with a double square user interface element instead of a circle user interface element (like the user interface elements representative of the other channels). As a non-limiting example, and for the purpose of this discussion, the double square user interface element can indicate that the associated channel (e.g., Channel B) is an externally shared channel. In some examples, such a user interface element can be the same for all externally shared channels. In other examples, such a user interface element can be specific to the other group with which the externally shared channel is associated. In some examples, additional or alternative graphical user interface elements can be used to differentiate between public channels, private channels, shared channels, channels associated with different workspaces, and the like. In other examples, channels that the user is not a current member of may not be represented in the second subsection 208 of the user interface 200. In such examples, the user may navigate to a different interface (not shown) to browse additional channels that are accessible to the user but to which the user is not currently a member.

In some examples, individual of the user interface elements representative of channels can be associated with one or more other user interface elements for communicating information to a user. For instance, a user interface element (e.g., a lock) can be associated with the user interface element corresponding to Channel D, which can indicate that the channel is a private channel. The user interface elements illustrated in FIG. 2 are non-limiting examples of user interface elements that can be associated with the user interface 200 to communicate information to a user.

In addition to the second subsection 208, the first section 202 can include a third subsection 210 that can include user interface elements representative of direct messages. That is, the third subsection 210 can include user interface elements representative of virtual spaces that are associated with private messages between one or more users, as described above.

As described above, in at least one example, the user interface 200 can include a second section 206 that, in some examples, can be associated with a data feed indicating messages posted to and/or actions taken with respect to a channel and/or other virtual space (e.g., a virtual space associated with direct message communication(s), a virtual space associated with event(s) and/or action(s), etc.) for facilitating communications. As described above, in at least one example, data associated with the second section 206 can be associated with the same or different workspaces. That is, in some examples, the second section 206 can present data associated with the same or different workspaces via an integrated data feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user and/or application posted the message and/or performed an action. In some examples, the message posted by an application may indicate a status of an event (e.g., pending, in review, completed, etc.) as further discussed below.

For purposes of this discussion, a "message" can comprise an object provided by a user using the user computing device 104 and/or an application that is configured for display within a channel, direct message, and/or other virtual space for facilitating communications. A message may include any text, image, video, audio, or combination thereof provided by a user (using a user computing device), or a status of an event. For instance, the user may provide a message that includes text, an image, and/or a video, within the message as message contents. In such an example, the text, image, and/or video can comprise the message. Each message sent or posted to a channel of the communication platform can include metadata comprising a sending user identifier (e.g., identifying a sending user or an originating user), a receiving user identifier (e.g., identifying a receiving user or entity), a message identifier (e.g., identifying the message), a group identifier (e.g., identifying a group with which the message is associated), a channel identifier (e.g., identifying a channel with which the message is associated), a direct message identifier (e.g., identifying a direct message with which the message is associated), or the like. In at least one example, each of the foregoing identifiers may comprise American Standard Code for Information Interchange (ASCII) text, a pointer, a memory address, or the like. In at least one example, such metadata can include additional or alternative data including, but not limited to, message contents, an originating source (e.g., which user and/or application a message originated and/or was sent from), a date the message was sent, a timestamp associated with when the message was sent, a priority (e.g., low, normal, high, etc.) associated with the message, an expiration date associated with the message, an open/closed status associated with the message, a label associated with the message, an assignee associated with the message, etc. In at least one example, messages can be represented by user interface elements in the user interface 200.

In some examples, a user can comment on a message in a "thread." A thread can be a message associated with another message that is not posted to a channel, but instead is maintained within an object associated with the original message. Messages and/or threads can be associated with file(s), emoji(s), application(s), etc. and can be viewed based on an interaction with a user interface element representative of the thread. In some examples, such a user interface element can be associated with an actuation mechanism that when actuated can cause the threaded messages to be presented via the user interface 200. In some examples, the threaded messages can be presented via a third section of the user interface 200.

A channel, direct message, or other virtual space can be associated with data and/or content other than messages, or data and/or content that is associated with messages. For example, non-limiting examples of additional data that can be presented via the second section 206 of the user interface 144 include members added to and/or removed from the channel, file(s) (e.g., file attachment(s)) uploaded and/or removed from the channel, application(s) added to and/or removed from the channel, post(s) (data that can be edited collaboratively, in near real-time by one or members of a channel) added to and/or removed from the channel, description added to, modified, and/or removed from the channel, modifications of properties of the channel, etc. Indications of such additional data and/or actions can present as messages and can be represented by user interface elements in the user interface 200.

In some examples, applications and/or other services integrated into the communication platform can perform actions and/or otherwise provide data that can be presented via the second section 206. In some examples, such actions and/or other data can be associated with events. In some examples, such actions and/or other data can present as messages. That is, actions performed by applications and/or services can be represented by user interface elements in the user interface 200. For example, an update to an object can be associated with a message presented via the second section 206. In another example, the completion of a task performed via an application can be associated with a message that can be presented via the second section 206. That is, the second section 206 can present messages associated with users and/or applications. In some examples such messages, and associated metadata, can be referred to as "events." In some examples, such applications and/or services can be third-party applications and/or services.

As described above, individual messages (from users, applications, and/or the like) can be associated with metadata. Such metadata can include identifier(s), an originating source (e.g., which user and/or application a message originated and/or was sent from), a date the message was sent, a timestamp associated with when the message was sent, a priority (e.g., low, normal, high, etc.) associated with the message, an expiration date associated with the message, an open/closed status associated with the message, a label associated with the message, an assignee associated with the message, etc. In at least one example, such metadata can be appended to the individual messages when they are received by the server(s) 102. That is, in such an example, an originating source can generate and/or associate metadata with a message prior to sending it to the server(s) 102. In at least one example, metadata can be generated by the server(s) 102 and associated with the message by the server(s) 102. In some examples, metadata associated with a message can be generated in part by the originating source and in part by the server(s) 102. In some examples, the metadata can be used for determining how to present a message in the user interface 200. For example, messages with different priorities indicated in associated metadata can be presented with different presentation characteristics (e.g., size, font, color, animation, in a message digest (or not), etc.). In some examples, metadata associated with a message can be used for annotating the user interface 200, searching, filtering, and/or triggering workflows.

In some examples, the second section 206 can comprise a data feed associated with a single channel. In such examples, data associated with the channel can be presented via the data feed. In at least one example, data associated with a channel can be viewable to at least some of the users of a group of users associated with a same group identifier. In some examples, for members of a channel, the content of the channel (e.g., messaging communications and/or objects) can be displayed to each member of the channel. For instance, a common set of group-based messaging communications can be displayed to each member of the channel such that the content of the channel (e.g., messaging communications and/or objects) may not vary per member of the channel. In some examples, messaging communications associated with a channel can appear differently for different users (e.g., based on personal configurations, group membership, permissions, policies, etc.).

In at least one example, the format of the individual channels or virtual spaces may appear differently to different users. In some examples, the format of the individual channels or virtual spaces may appear differently based on which workspace or organization a user is currently interacting with or most recently interacted with. In some examples, the format of the individual channels or virtual spaces may appear differently for different users (e.g., based on personal configurations, group membership, permission(s), etc.). In some examples, presentation characteristics can appear differently to different users (e.g., based on personal configurations, group membership, permission(s), etc.).

In at least one example, the user interface 200 can include a search mechanism 212, wherein a user can input a search term and the server(s) 102 can perform a search associated with the communication platform. In some examples, the search can be performed across each group with which the user is associated, or the search can be restricted to a particular group, based on a user specification.

In FIG. 2, the user can interact with the user interface element that corresponds to Channel D in the second subsection 208 and as such, a data feed associated with the channel can be presented via the second section 206 of the user interface. In some examples, the second section 206 can be associated with a header that includes user interface elements 214 representing information associated with Channel D. Furthermore, the second section 206 can include user interface elements 216, 218, 219, 220, and 221, which each represent messages posted to the channel. As illustrated, the user interface elements 216-221 can include an indication of a user and/or application that posted the message, a time when the message was posted, content associated with the message, reactions associated with the message, and/or the like. In at least one example, the second section 206 can include an input mechanism 222, which can be associated with a message composition user interface to enable a user to compose a message to be posted to the channel. While described above as a private, internal channel, in some examples, Channel D can be a public channel, an externally shared channel, an announcement channel, or the like. Channel D is merely provided for illustrative purposes.

In at least one example, the user interface 200 can be associated with an object interface 224. The object interface 224 is illustrated as a bar, positioned at the top of the second section 206, proximate the user interface elements 214 representing information associated with the Channel D. That is, in FIG. 2, the object interface 224 is presented proximate to, or within a threshold distance of, the header of Channel D. In some examples, the object interface 224 can be associated with one or more user interface elements 226 representative of objects that have been "pinned" or otherwise associated with the object interface 224. By associating objects with the object interface 224, the user can quickly access such objects without scrolling or otherwise navigating through other data associated with the channel. In some examples, the user interface element(s) 226 can include an indication of an application, a name or title of an object, and/or the like. In some examples, such user interface element(s) 226 can be associated with actuation mechanism(s) that when actuated can cause the retrieval of the corresponding object(s) for presentation. In some examples, the retrieved object(s) can be presented in the user interface 200, as described herein. In some examples, the retrieved object(s) can be presented via a web browser or another user interface associated with another application. Additional details are provided below.

In at least one example, the object interface 224 can include a user interface element 228, that can be associated with an actuation mechanism. The actuation mechanism, when actuated can enable additional object(s) to be associated with the object interface 224. Object(s) can be associated with the object interface 224 via additional or alternative mechanisms. For example, the communication platform can annotate the user interface 200 with user interface elements to indicate when object(s) can be associated with the object interface 224. In some examples, an object that can be associated with the object interface 224 can be associated with a user interface element 230 that enables the user to add the object to the object interface 224. For example, the user interface element 230 can be associated with an actuation mechanism that, when actuated, can enable the user to add the object to the object interface 224. In some examples, a user can drag and drop an object in the object interface 224 such to "pin" or otherwise associate the object with the object interface 224. Additional details associated with the user interface 200 and the object interface 224 are described below.

FIGS. 3A, 3B, and 3C illustrate examples of the object interface 224 of FIG. 2. That is, FIGS. 3A-3C each illustrate a different configuration of the object interface 224 that can be presented via the user interface 200. In some examples, as illustrated in FIG. 3A, the object interface 224 can be positioned in line with the user interface elements 214 representing information associated with a virtual space, such as Channel D. In some examples, as illustrated in FIGS. 3B and 3C, the object interface 224 can be positioned above or below the user interface elements 214 representing information associated with a virtual space, such as Channel D. In each example, the object interface 224 can be in the header of the virtual space, which enables the user to easily locate the object interface 224 and quickly access the object(s) associated therewith.

In some examples, the user interface elements 226 can be arranged based at least in part on interaction data. That is, the object interface management component 116 can track interactions with objects that are associated with the object interface 224 and can rearrange the objects based at least in part on such interaction data. In some examples, the object interface management component 116 can arrange objects associated with the object interface 224 based at least in part on recency of interaction, frequency of interaction, length of interaction, and/or the like, which can be determined based at least in part on interaction data. As such, object(s) with which a user or other users associated with a virtual space interact with most recently, more frequently, or for longer periods of time can be prioritized in the object interface 224 over other object(s) with which a user or other users associated with a virtual space interact with less recently, less frequently, or for shorter periods of time. In some examples, the object interface management component 116 can automatically arrange the object(s) based at least in part on the interaction data described above. That is, in some examples, the order or the arrangement of the object(s) can be determined, by the object interface management component 116, based at least in part on the interaction data and can be presented via the object interface 224 based at least in part on the order or arrangement as determined. In some examples, a user associated with the virtual space can arrange the object(s) associated with the object interface 224 manually (e.g., via a drag and drop operation or the like). That is, in some examples, the order or the arrangement associated with the user interface elements 226 is configurable by the user. In some examples, the arrangement of the object(s) associated with the object interface 224 can be the same for all users associated with the virtual space with which the object interface 224 is associated. In some examples, the arrangement of the object(s) associated with the object interface 224 can be different for individual of the users associated with the virtual space.

In some examples, as described herein, individual of the user interface elements 226 can be associated with multiple objects such that actuation of an actuation mechanism associated with a user interface element can cause additional user interface elements to be presented via the user interface 200. The additional user interface elements can be associated with objects that are associated with the object interface 224. In at least one example, a user can interact with one of the additional user interface elements to access an object associated therewith. Additional details are provided below.

In some examples, more objects can be associated with the object interface 224 than can be presented via the object interface 224. In some examples, the object interface 224 can include a user interface element 302 that can be associated with an actuation mechanism. In at least one example, based at least in part on receiving an indication of an interaction with the actuation mechanism associated with the user interface element 300 (e.g., from the application 140), the object interface management component 116 can cause additional or alternative user interface elements to be presented via the object interface 224 and/or via another user interface presented via the user interface 200.

In some examples, the object interface 224 can be associated with a user interface element 302 that enables the object interface 224 to be shared with other users, virtual spaces, etc. For example, the user interface element 302 can be associated with an actuation mechanism that when actuated can enable a user to designate another user, a virtual space, or the like with which the object interface 224 is to be shared. In at least one examples, based at least in part on receiving an indication of which user, virtual space, or the like the object interface 224 is to be shared, the object interface management component 116 can associate the object interface 224 with the indicated user, virtual space, or the like and can cause the object interface 224 to be presented via an instance of the user interface 200 on a user computing device associated therewith. For example, if the object interface 224 is shared with a new channel, the object interface 224 can be presented in association with the header of the new channel when presented via the user interface 200. Or, if the object interface 224 is shared with a particular user, the object interface 224 can be presented in association with one or more virtual spaces accessible by the particular user (e.g., via an instance of the user interface 200 presented via the user computing device of the user).

While FIGS. 3A-3C illustrate examples wherein the object interface 224 comprises a "bar" configuration, in some examples, the object interface 224 can comprise additional or alternative configurations. For instance, in at least one example, the user interface elements 226 can be stacked or otherwise arranged. In some examples, the object interface 224 can be positioned in the first section 202 of the user interface, the second section 206 of the user interface, in the header (e.g., as illustrated in FIGS. 3A-3C), proximate the input mechanism 222, and/or the like.

Figure 4A:
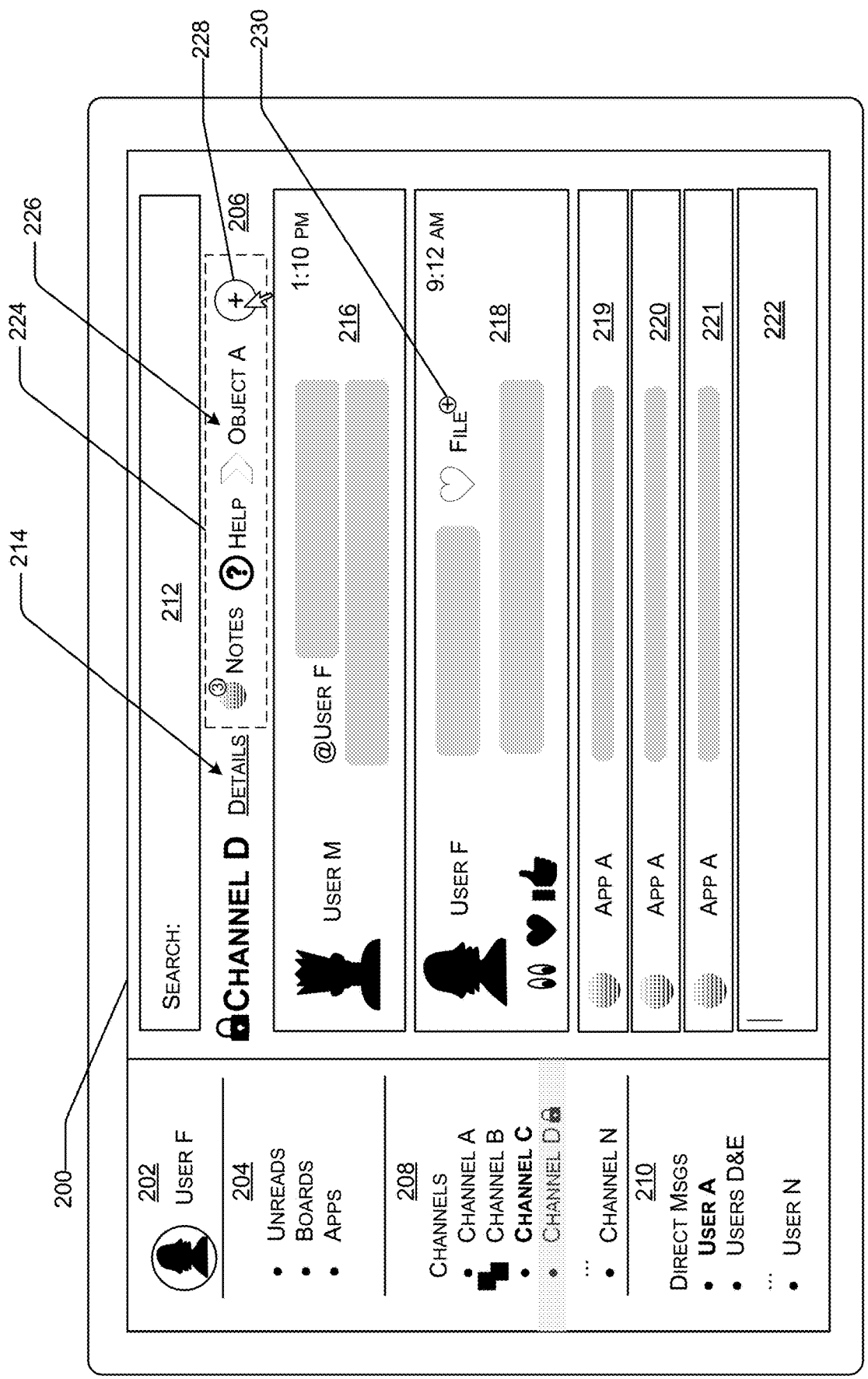
FIGS. 4A-4I illustrate examples of a user interface of a communication platform and an object interface presented via the user interface, as described herein.
Figure 4B:
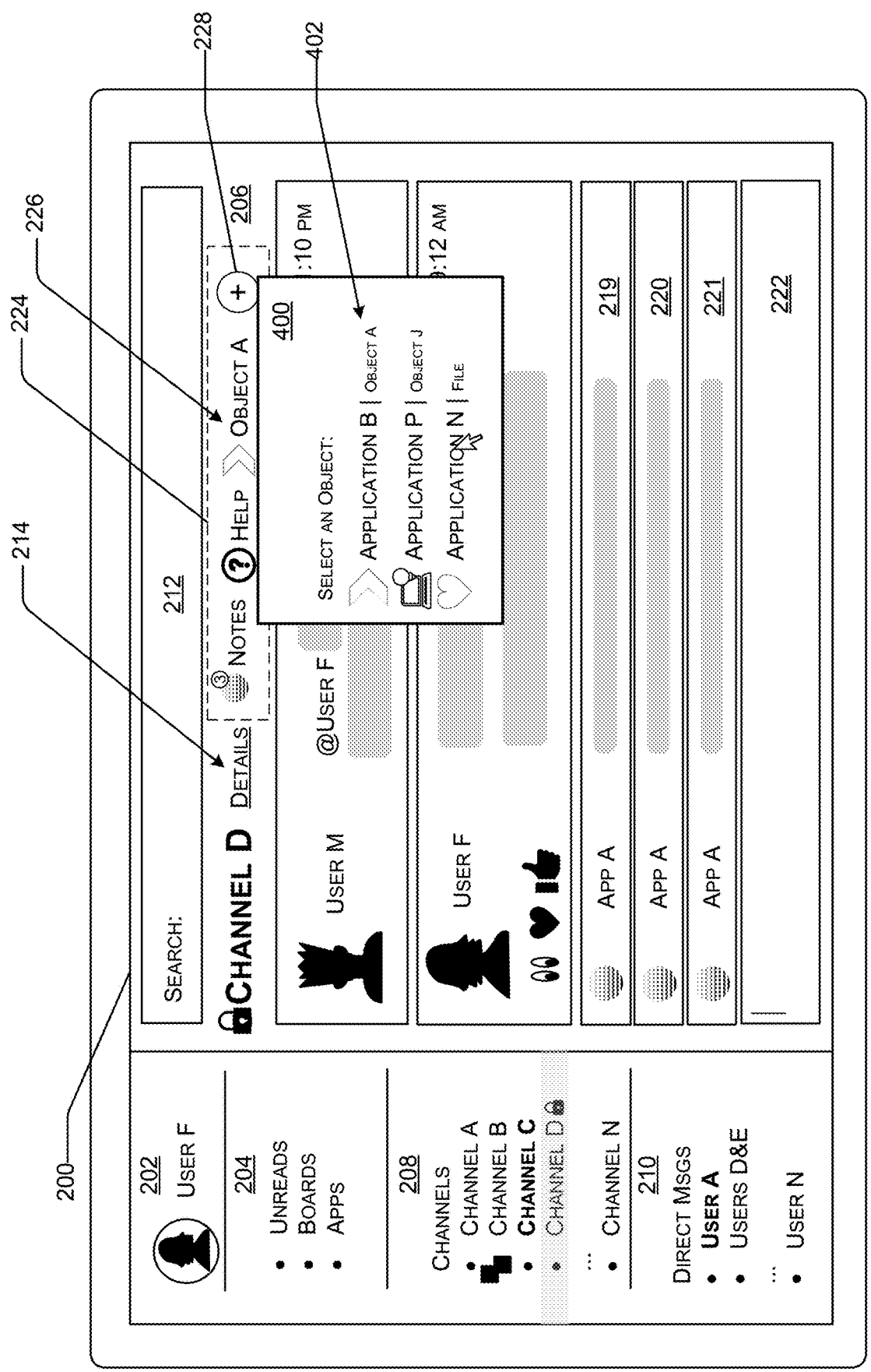

FIGS. 4A-4I illustrate examples of a user interface of a communication platform and an object interface presented via the user interface, as described herein. As described above, in at least one example, the user interface 200 can be associated with an object interface 224, as illustrated in FIG. 4A. In at least one example, the object interface 224 can include a user interface element 228, that can be associated with an actuation mechanism. The actuation mechanism, when actuated can enable additional object(s) to be associated with the object interface 224, as illustrated in FIG. 4B. That is, based at least in part on detecting actuation of the actuation mechanism associated with the user interface element 228, the application 140 can send an indication of such an actuation to the object interface management component 116. That is, the application 140 can receive a request to associate a new object with the object interface 224 and can send the request to the server(s) 102.

In at least one example, the object interface management component 116 can receive the request and, in some examples, can identify one or more objects that are relevant to the user and/or the virtual space associated with the request. In some examples, the one or more identified objects can be object(s) associated with the virtual space with which the request is associated. That is, such "relevance" can be determined based at least in part on the object(s) being associated with the virtual space. In some examples, the one or more identified objects can be object(s) associated with the user with which the request is associated. That is, such "relevance" can be determined based at least in part on the object(s) being associated with the user. In some examples, such "relevance" can be determined based at least in part on interaction data. For example, the one or more identified objects can be determined to be associated with interaction(s) within a threshold period of time of receiving the request (e.g., object(s) with which the user and/or other users associated with the virtual space recently interacted with). In some examples, the one or more identified objects can be determined to be associated with frequency(s) above a threshold (e.g., object(s) with which the user or other users associated with the virtual space frequently interact with). In some examples, the one or more identified objects can be determined to be associated with interaction lengths above a threshold (e.g., object(s) with which the user or other users associated with the virtual space have interacted with for significant amounts of time).

In at least one example, the object interface management component 116 can cause the one or more identified objects to be presented via a user interface element 400, as illustrated in FIG. 4B. In at least one example, the user interface element 400 can correspond to an object selection user interface. In at least one example, the user interface element 400 can comprise a pop-up, overlay, new user interface, portion of the user interface 200. In at least one example, the user interface element 400 can include one or more additional user interface elements 402 that can represent one or more objects that can be associated with the object interface 224. In at least one example, each of the additional user interface elements 402 can be associated with an actuation mechanism that, when actuated, can cause the associated object to be associated with the object interface 224. For example, if the user actuates an actuation mechanism associated with the user interface element that corresponds to the "file" associated with "Application N," the object (i.e., the file associated with Application N) can be associated with the object interface 224. That is, the application 140 can detect the actuation of the actuation mechanism and can send an indication of such to the server(s) 102. The object interface management component 116 can receive the indication and can associate the object with the object interface 224. In some examples, the object selection user interface can include an input mechanism to enable the user to name the selected object for presentation via the object interface 224.

In some examples, the user interface element 400 can include an input mechanism to enable a user to input a link or other resource locator associated with an object to be associated with the object interface 224. In some examples, the user interface element 400 can include a search mechanism to search for an object, an indication of application(s) that are integrated with the communication platform and are associated with the virtual space, a mechanism to generate a new object, and/or the like.

Figure 4C:
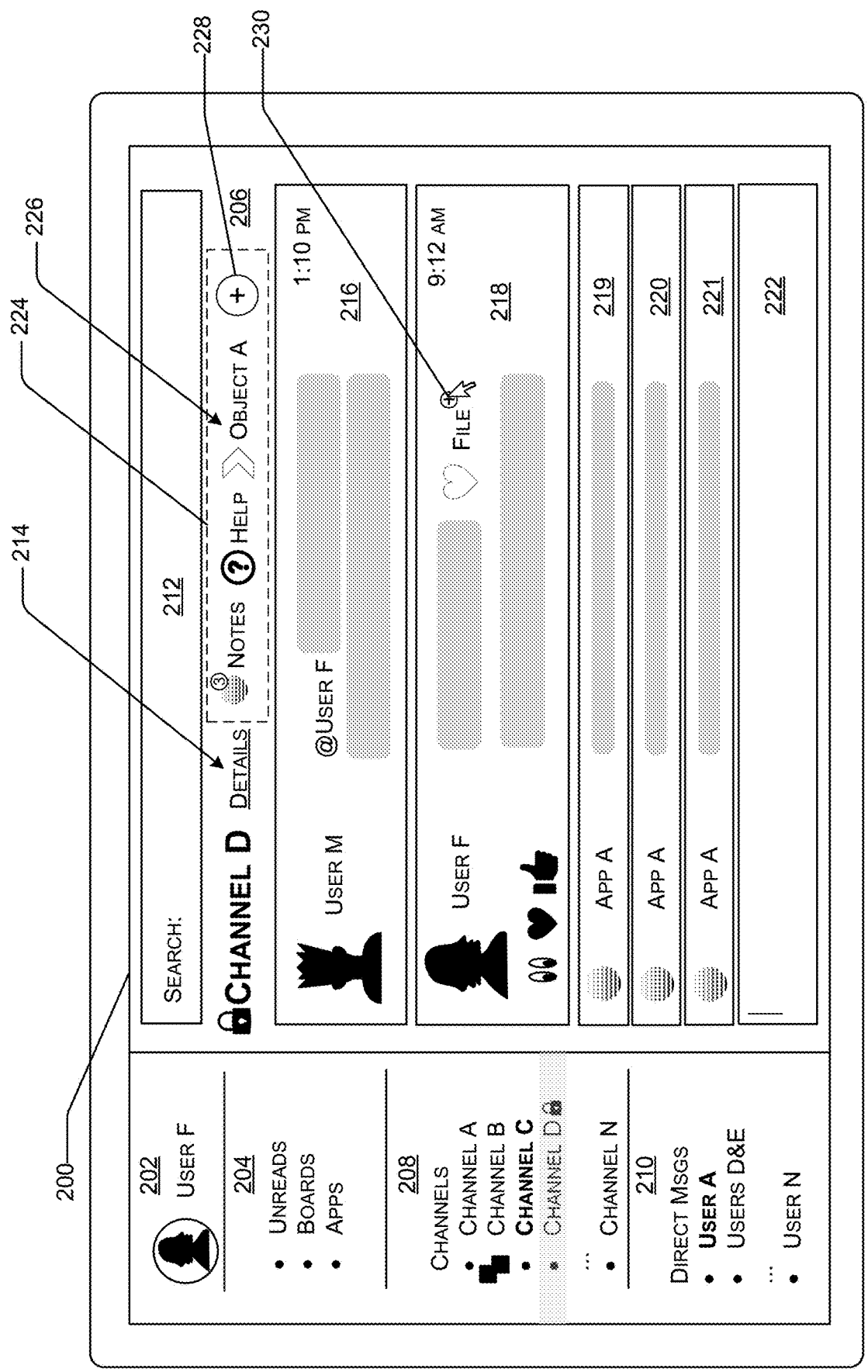
Figure 4D:
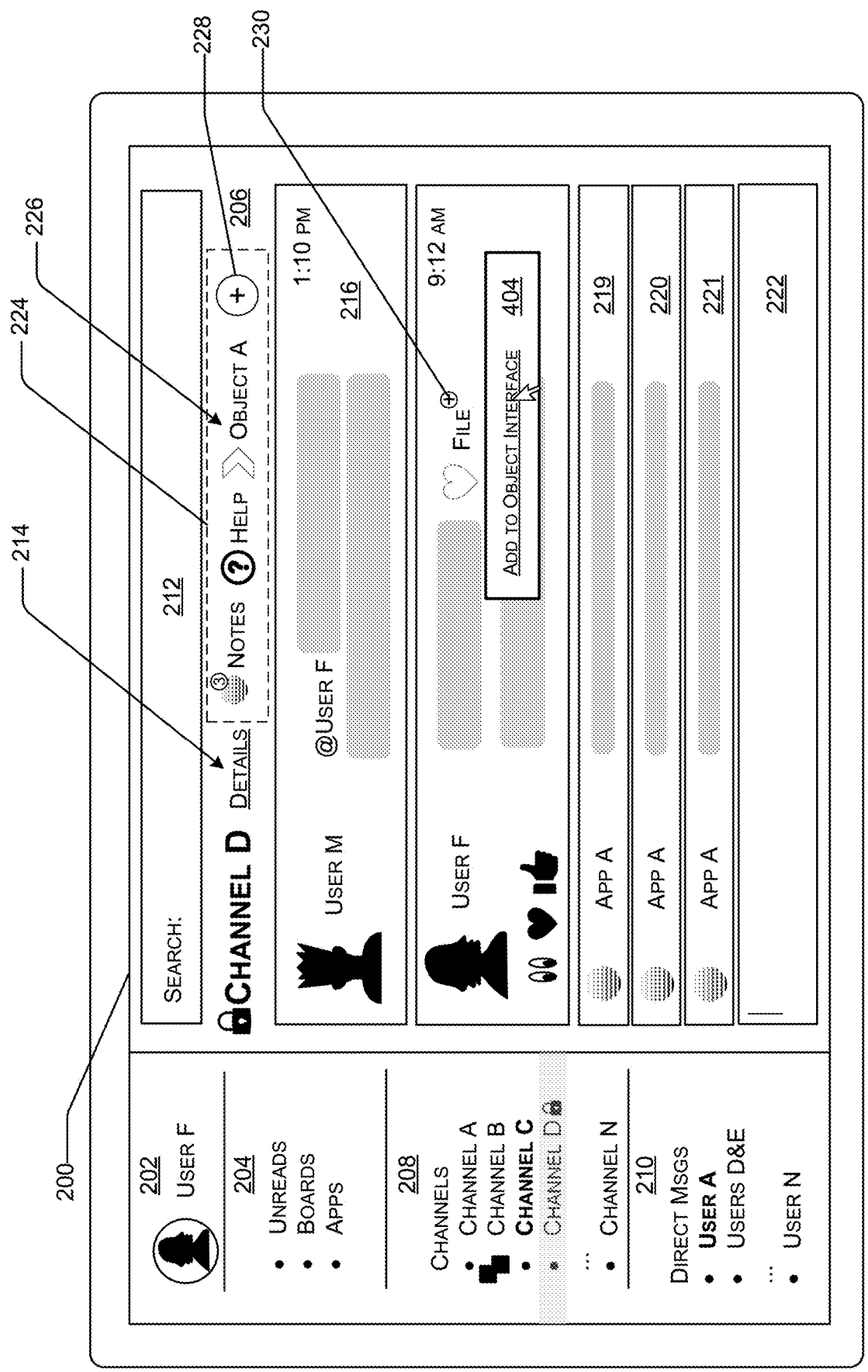

As described above, object(s) can be associated with the object interface 224 via additional or alternative mechanisms. For example, the communication platform can annotate the user interface 200 with user interface elements to indicate when object(s) can be associated with the object interface 224, as illustrated in FIG. 4C. In some examples, such annotation can be done by the object interface management component 116. In some examples, an object that can be associated with the object interface 224 can be associated with a user interface element 230 that enables the user to add the object to the object interface 224. For example, the user interface element 230 can be associated with an actuation mechanism that, when actuated, can enable the user to add the object to the object interface 224. That is, the application 140 can detect the actuation of the actuation mechanism and can send an indication of such to the server(s) 102. The object interface management component 116 can receive the indication and can associate the object with the object interface 224. In some examples, as illustrated in FIG. 4D, the object interface management component 116 can cause a user interface element 404 to be presented via the user interface 200, which can prompt the user to confirm the addition of the associated object (i.e., the file associated with Application N). In some examples, the user interface element 404 can correspond to a confirmation user interface. In at least one example, the application 140 can receive an indication of an interaction with the user interface element 404 and can send the indication to the object interface management component 116. Based at least in part on receiving the indication, the object interface management component 116 can associate the object with the object interface 224. In some examples, the confirmation user interface can include an input mechanism to enable the user to name the object for presentation via the object interface 224.

As described above, objects can be added to the object interface 224 by additional or alternative mechanisms. In some examples, an object can be automatically added to the object interface 224 when a user shares or otherwise mentions the object in association with a channel, direct message, board, or the like, with which the object interface 224 is associated. That is, based at least in part on detecting an object has been shared or mentioned in a channel, direct message, board, or the like, the object interface management component 116 can associate the object with the object interface 224. In some examples, a user may be prompted to confirm the association prior to the object interface management component 116 making such an association. In some examples, such an association can be made automatically. In some examples, a work flow can be triggered to add object(s) to the object interface 224. For example, the object interface management component 116 can detect that a user is accessing a particular object at a particular frequency or for a period of time that exceeds respective thresholds and can trigger a work flow to associate such an object with the object interface 224.

In some examples, the object interface management component 116 can determine that a user is accessing a particular object at a particular frequency or for a period of time and can recommend that such an object be added to the object interface 224. In some examples, the object interface management component 116 can determine that users associated with a channel, direct message, board, or the like are accessing a particular object at a particular frequency or for a period of time and can recommend that such an object be added to the object interface 224. In some examples, object(s) that are tagged or otherwise mentioned in channels, direct messages, boards, or the like can additionally trigger the object interface management component 116 to recommend such object(s) be added to the object interface 224. In some examples, recommendations, as described above, can be surfaced via an object selection user interface (e.g., the user interface element 400) or via another user interface element that can comprise a pop-up, overlay, or the like. Based at least in part on receiving an input indicating that the user desires to associate the recommended object with the object interface 224, the object interface management component 116 can associate the object with the object interface 224.

Figure 4E:
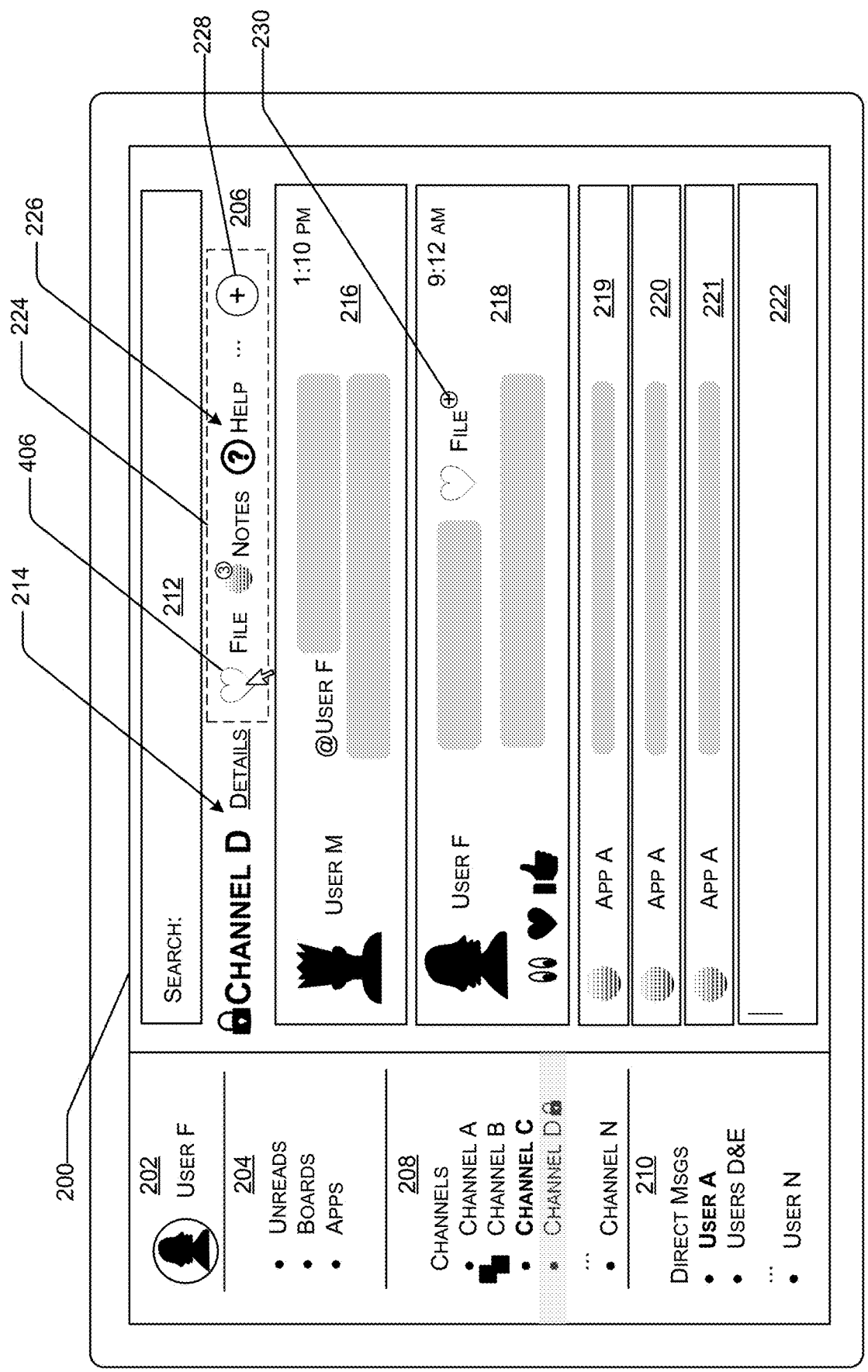

In at least one example, based at least in part on associating the object with the object interface 224, which can comprise a mapping or other association of an indication of the object with an indication of the object interface 224 in the datastore 122, for example, the object interface management component 116 can then cause a user interface element 406 representative of the object to be associated with the object interface 224. An example of such is illustrated in FIG. 4E, where the recently added object is now represented by a user interface element 406 associated with the object interface 224. As illustrated, the user interface element 406 identifies the object (e.g., "file," which can be a default or designated name) and an indication of the platform or application with which the object is associated. In some examples, the user interface element 406 can include additional or alternative information associated with the object.

Figure 4F:
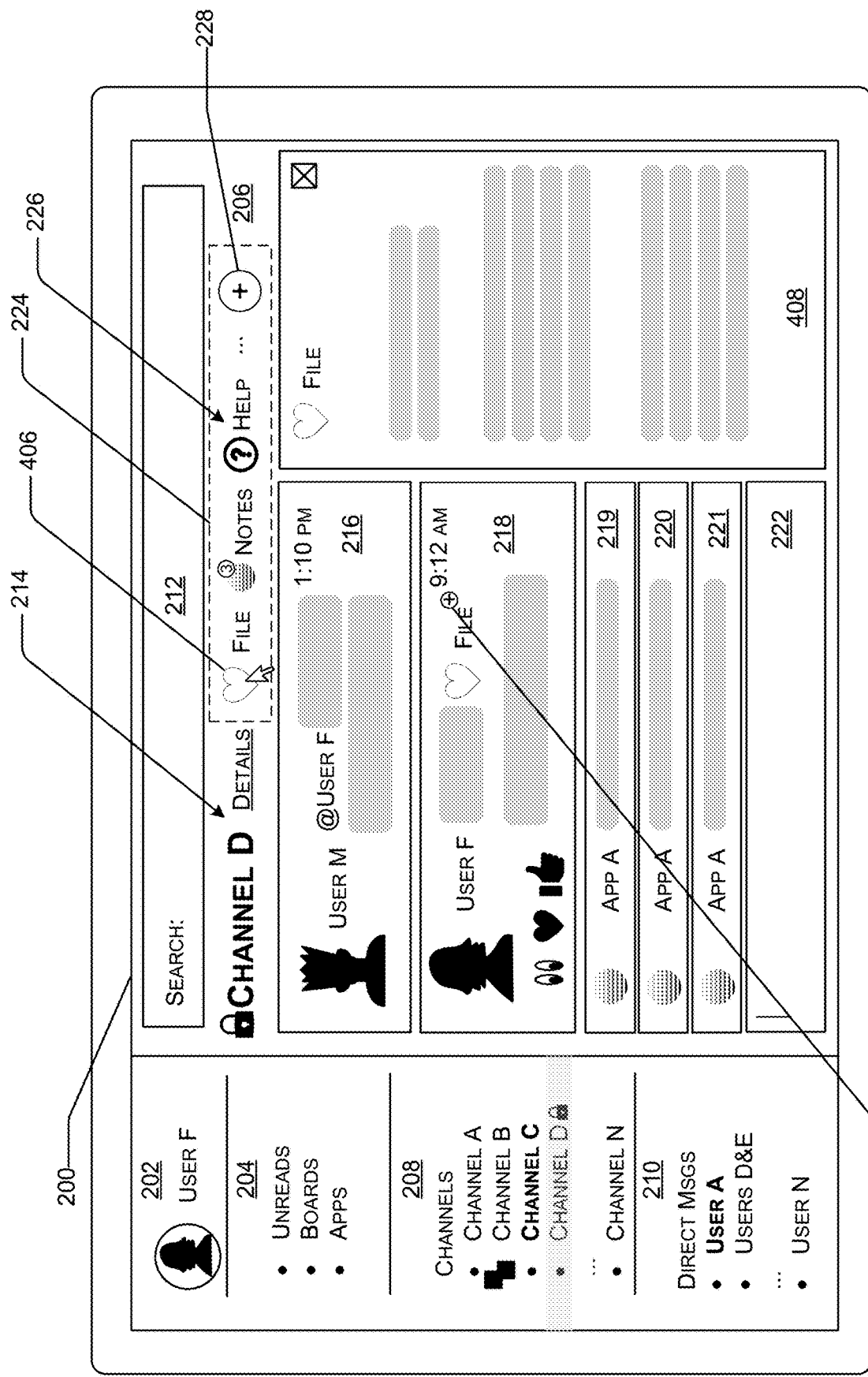
Figure 4G:
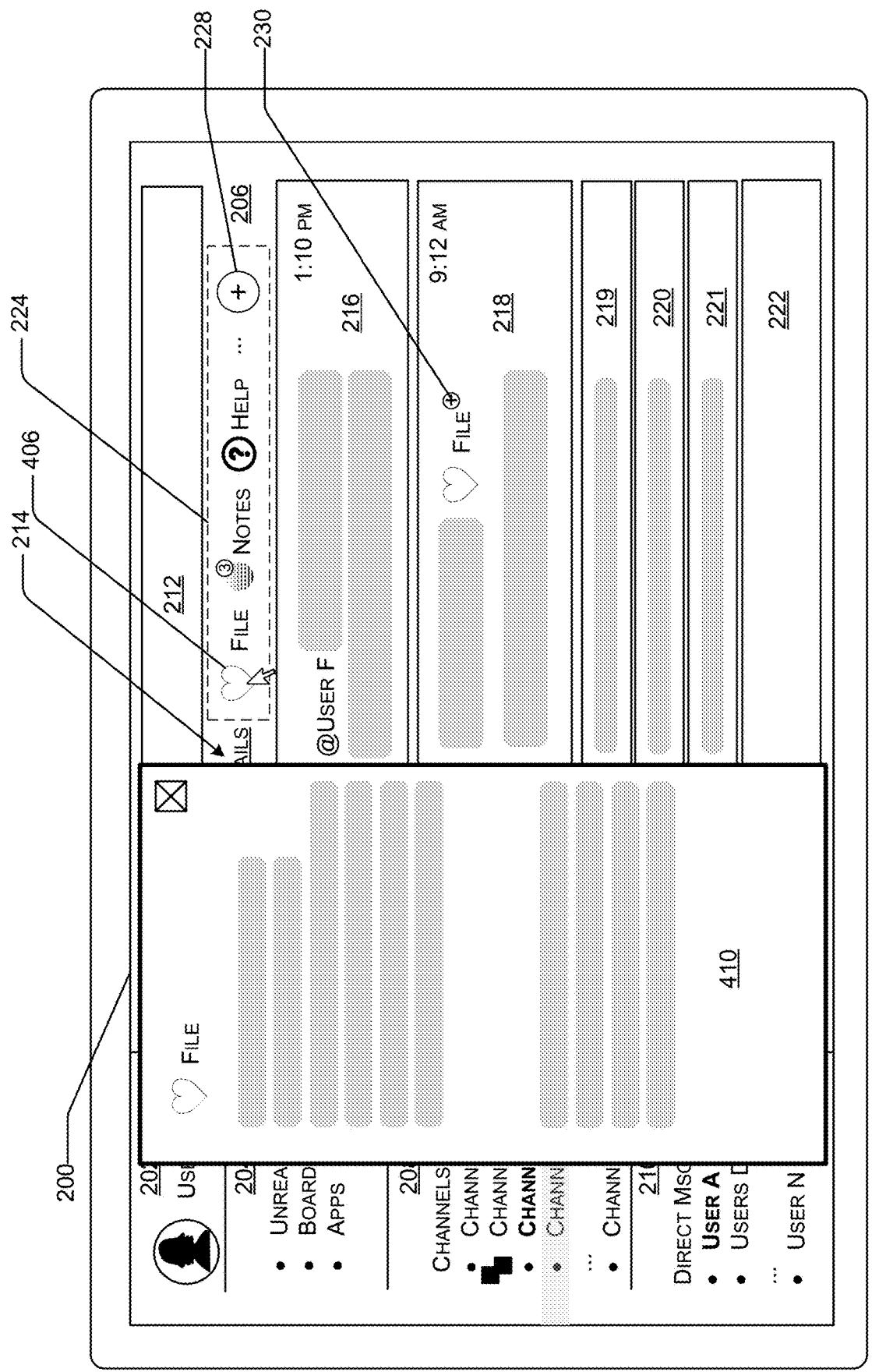

In at least one example, the user interface element 406 can be associated with an actuation mechanism that, when actuated, can cause the object (i.e., the file associated with Application N) to be presented via the user interface 200, as illustrated in FIGS. 4F and 4G. Or, in an example where an object is associated with a work flow (e.g., a work flow is "pinned" to the object interface 224), the work flow can be triggered via an interaction with the user interface element associated therewith and can be performed via the user interface 200. In an example where an object is a user profile (e.g., a user profile of a user is "pinned" to the object interface 224), actuation of an actuation mechanism associated with such an object can enable a user to message (e.g., direct message) the associated user. In examples where an object is a user profile, actuation of an actuation mechanism associated with such an object can cause an update associated with the user to be presented (e.g., a status update), a snippet of content associated with the user (e.g., a story) to be presented, or the like.

In at least one example, based at least in part on detecting an interaction with the user interface element 406, the application 140 can send an indication of the interaction to the server(s) 102. In at least one example, the interaction can comprise actuation of an actuation mechanism. In at least one example, the indication of the interaction can comprise a request to access the object. In some examples, the request can include an object identifier associated with the object. The object identifier can comprise a resource locator or another identifier that can be used to access the resource locator associated with the object. In at least one example, the object interface management component 116 can retrieve the object using the resource locator and cause the object to be presented via the user interface 200. In some examples, if the object is associated with a third-party platform, the server(s) 102 can retrieve the object via the third-party server(s) 121. In some examples, such a retrieval can be via an API or other mechanism that enables integration between the server(s) 102 and the third-party server(s) 121.

In at least one example, the object interface management component 116 can cause the object to be presented via the user interface 200, as illustrated in FIG. 4F. In some examples, the object can be presented via a user interface element 408 that is integrated with the second section 206. That is, the user interface element 408 can be embedded in the user interface 200 such that a user can access data associated with the group-based communication platform and the object via the same user interface. In some examples, the object can be presented via a new section of the user interface 200. In some examples, the object can be presented via the user interface 200 (e.g., as a takeover). In some examples, as illustrated in FIG. 4G, the object can be presented via a pop-up 410, overlay, or new user interface. In some examples, the pop-up, overlay, or new user interface can be associated with the communication platform or a third-party platform. In some examples, the pop-up, overlay, or new user interface can be presented via a web browser or an application associated with the communication platform or a third-party platform. In at least one example, the user can interact with the object via the user interface 200, pop-up, overlay, new user interface, and/or the like such to directly affect changes to the object.

Figure 4H:
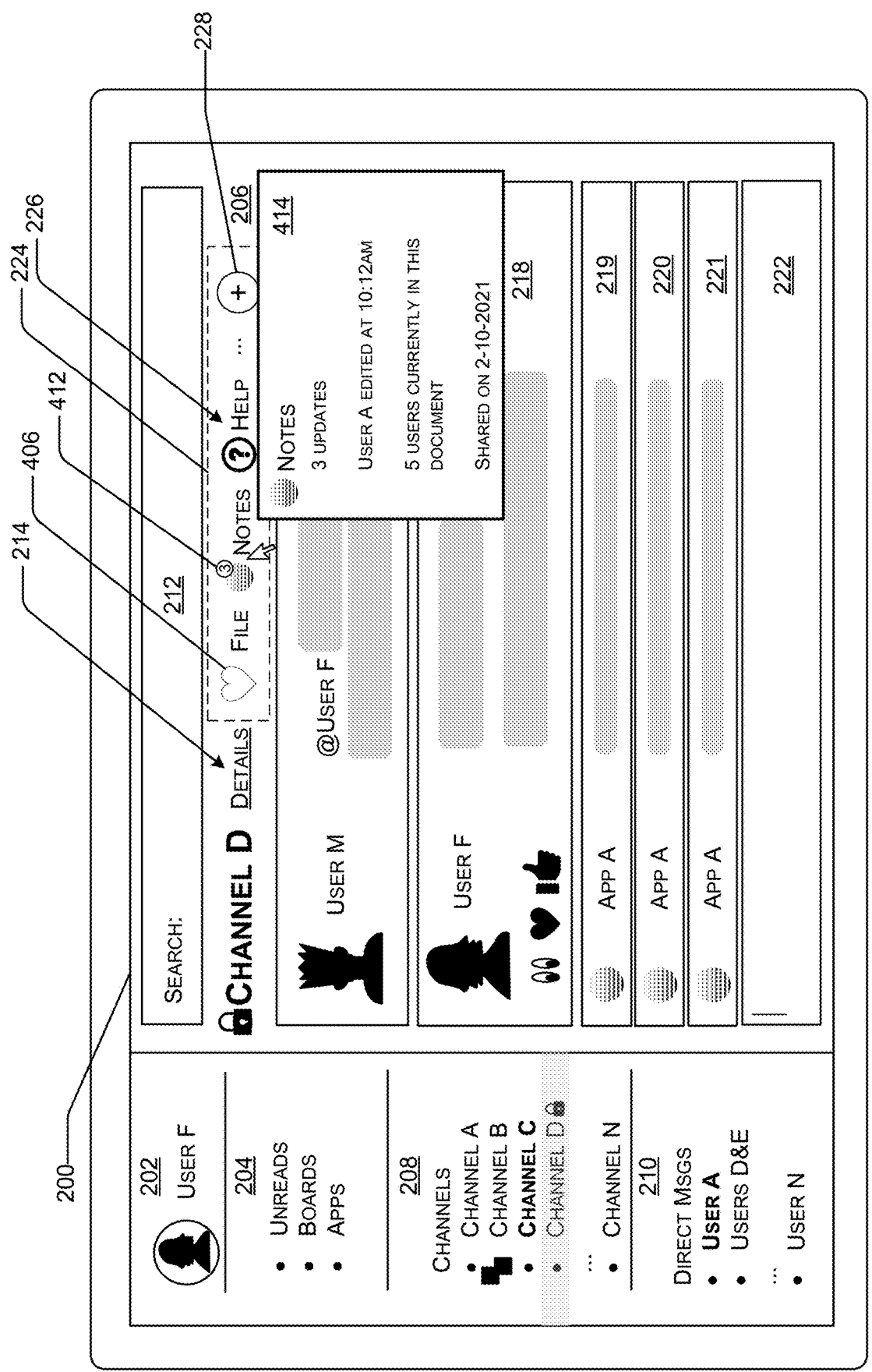

FIG. 4H illustrates an example of a user interface element 412 (e.g., a badge or the like) that can be presented in association with one or more of the user interface elements 226 associated with the object interface 224. That is, in at least one example, the object interface management component 116 can receive notifications indicating modifications or other interactions with object(s) associated with object interface(s). In some examples, such notifications can be received via API(s) or other mechanisms for facilitating communication between objects and platforms and/or applications associated with such objects. In at least one example, based at least in part on receiving a notification or other indication of an update to an object (e.g., via the API(s) or otherwise), the object interface management component 116 can annotate the user interface. For instance, in at least one example, the object interface management component 116 can cause a user interface element 412 (e.g., a badge or the like) to be associated with a user interface element representative of the object in the object interface 224. In some examples, the user interface element 412 may be removed from the object interface 224 in response to a user accessing the object or otherwise acknowledging the notification. In some examples, if additional notifications associated with modifications or other interactions are received prior to a first notification being removed, the user interface element 412 can be associated with a count that increases based on receiving new notifications.

In some examples, in addition to or as an alternative of, causing the user interface element 412 to be presented via the object interface 224, the object interface management component 116 can cause one or more messages associated with the one or more notifications to be presented in a data feed of the channel (or other virtual space with which the object is associated with the object interface 224). As an example, the user interface 200 includes user interface elements 219-221, which can represent each of the updates represented by the user interface element 412.

In some examples, based at least in part on detecting an interaction, such as a scroll over or dwell, associated with a user interface element of the user interface elements 226, a user interface element 414 can be presented via the user interface 200. In at least one example, the user interface element 414 can correspond to an object information user interface. In at least one example, the user interface element 414 can be presented as a pop-up, overlay, new user interface, a section of the user interface 200, and/or the like. In at least one example, the user interface element 414 can present information associated with the object, such as a number of updates (e.g., modifications or other interactions since the user last accessed the object), a most recent modification or other interaction, a timestamp associated with the most recent modification or other interaction, a number of users currently interacting with the object, a date and/or timestamp that the object was shared (i.e., associated with the object interface 224), and/or the like. That is, in at least one example, the application 140 can detect the interaction and send an indication of such to the server(s) 102. The object interface management component 116 can retrieve the data to be presented via the user interface element 414, which can be stored in the object data 126, and can cause the data to be presented via the user interface element 414.

Figure 4I:
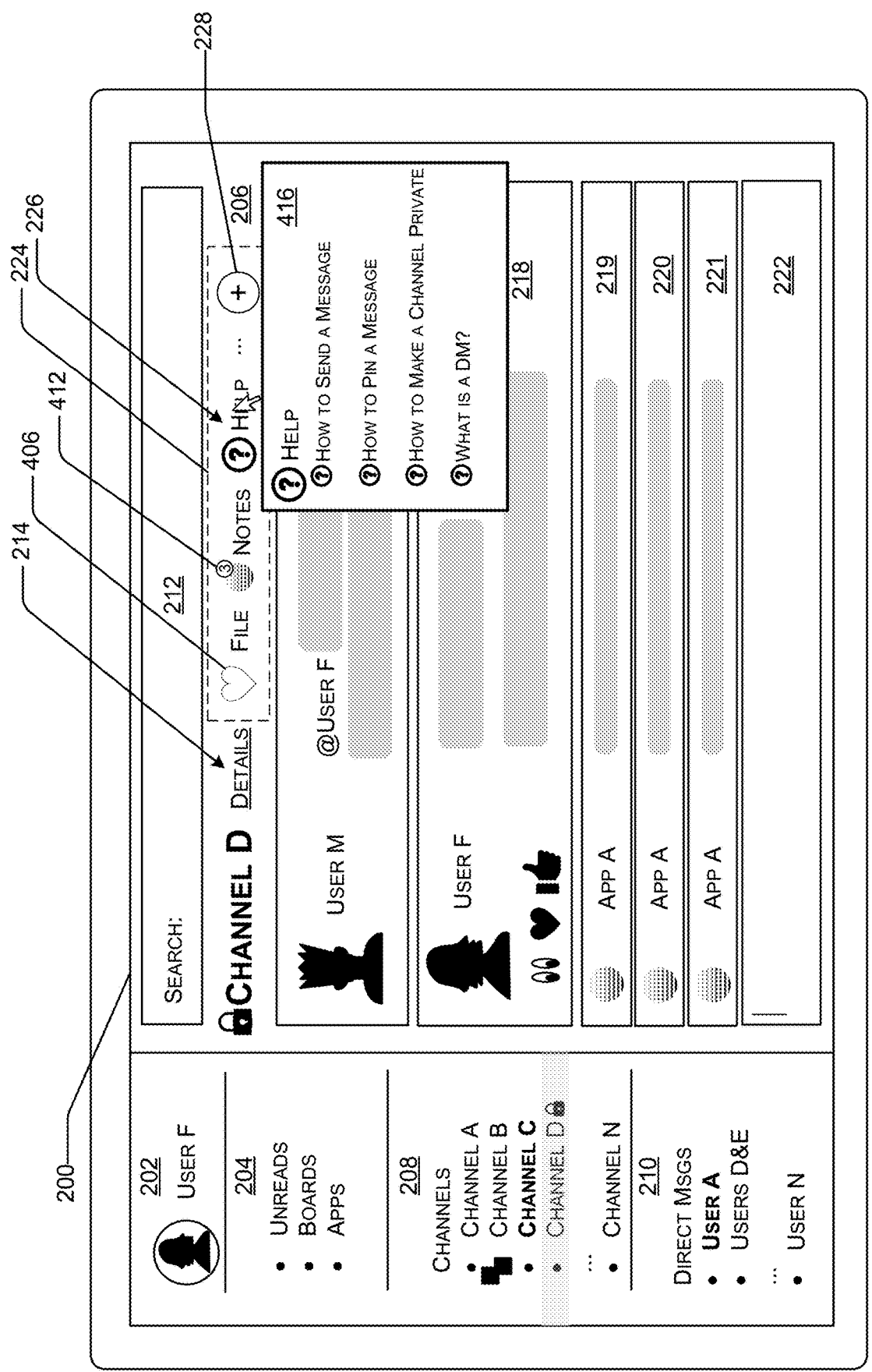

FIG. 4I illustrates an example wherein a user interface element of the user interface elements 226 represents more than one object. As described above, in some examples, a user interface element of the user interface elements 226 can represent one or more objects. In at least one example, based at least in part on detecting an actuation of an actuation mechanism with the user interface element, the object interface management component 116 can cause a user interface element 416 to be presented via the user interface 200. In at least one example, the user interface element 416 can include one or more other user interface elements that represent one or more objects. In some examples, each of the object(s) can be associated with a same source (e.g., platform or application). In some examples, each of the objects can be associated with a same author, user, group of users, topic, or the like. In at least one example, each of the object(s) can be associated with an actuation mechanism that, when actuated, can cause the actuation mechanism to be presented via the user interface 200 as described herein.

It should be noted that when an object interface 224 is associated with a virtual space, each user associated with the virtual space can add object(s) to the object interface 224. In an example where the virtual space is a shared space (e.g., associated with multiple workspaces, multiple organizations, or the like), users from each of the multiple workspaces or organizations can add object(s) to the object interface 224. In some examples, object(s) can be removed from the object interface 224 based on interaction data, after a lapse of a period of time, after the occurrence of an event (e.g., the object is deleted or otherwise removed), or by an explicit action to remove an object from the object interface 224. Removal of an object from the object interface 224 can terminate any mapping or other associations between the object and the object interface 224.

Figure 5A:
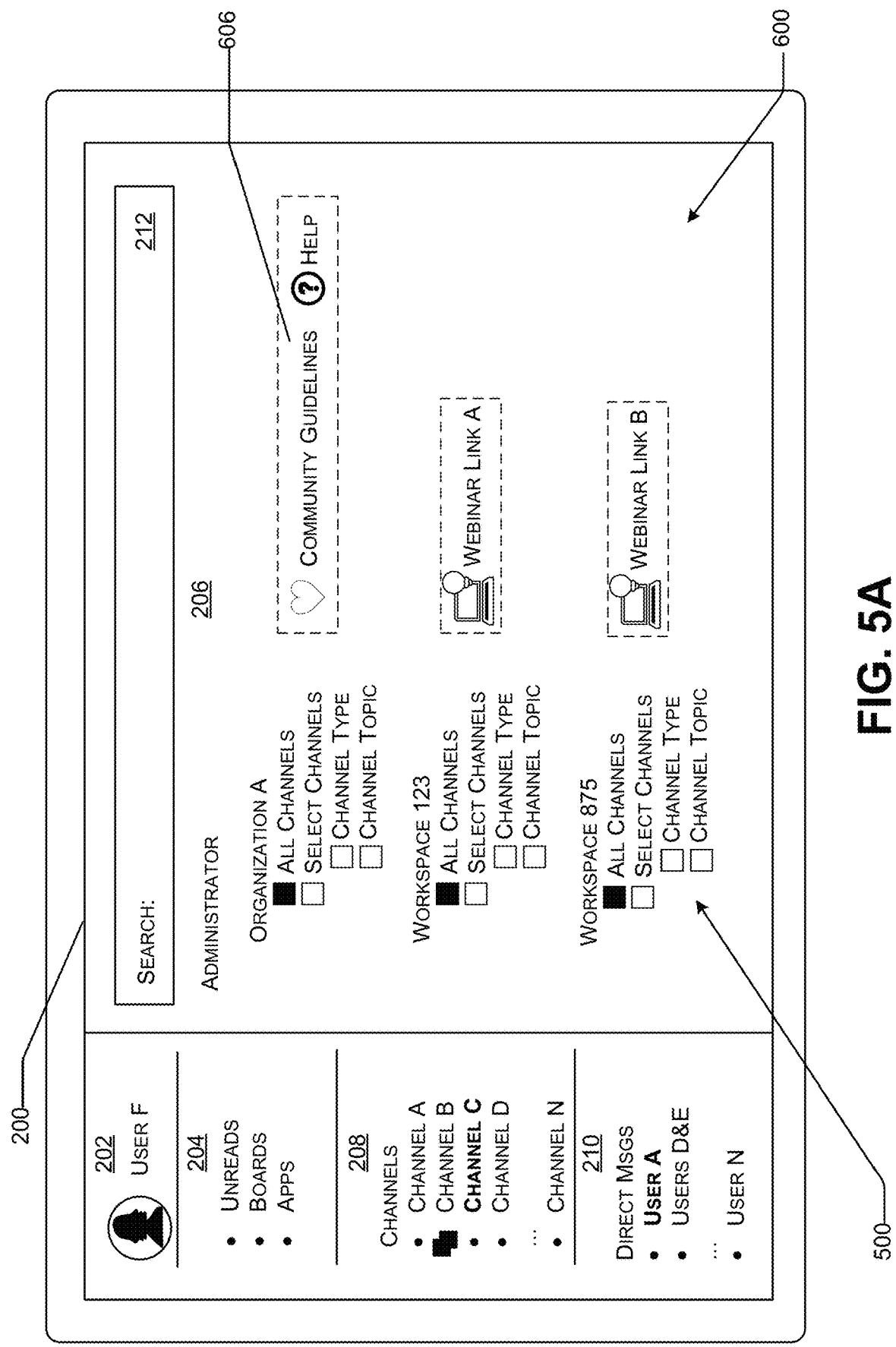
FIGS. 5A-5C illustrate other examples of user interfaces presented via a communication platform, as described herein.
Figure 5B:
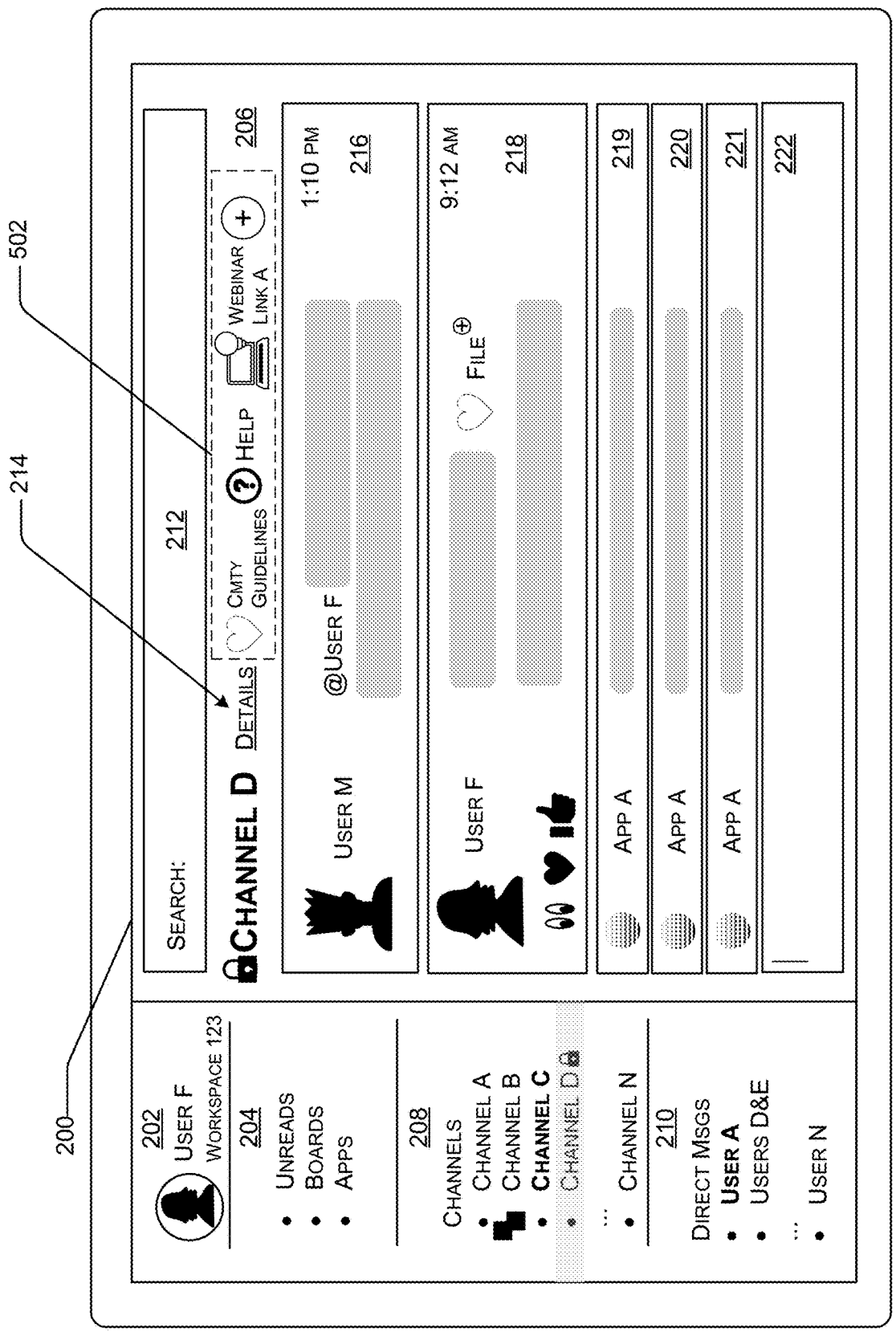
Figure 5C:
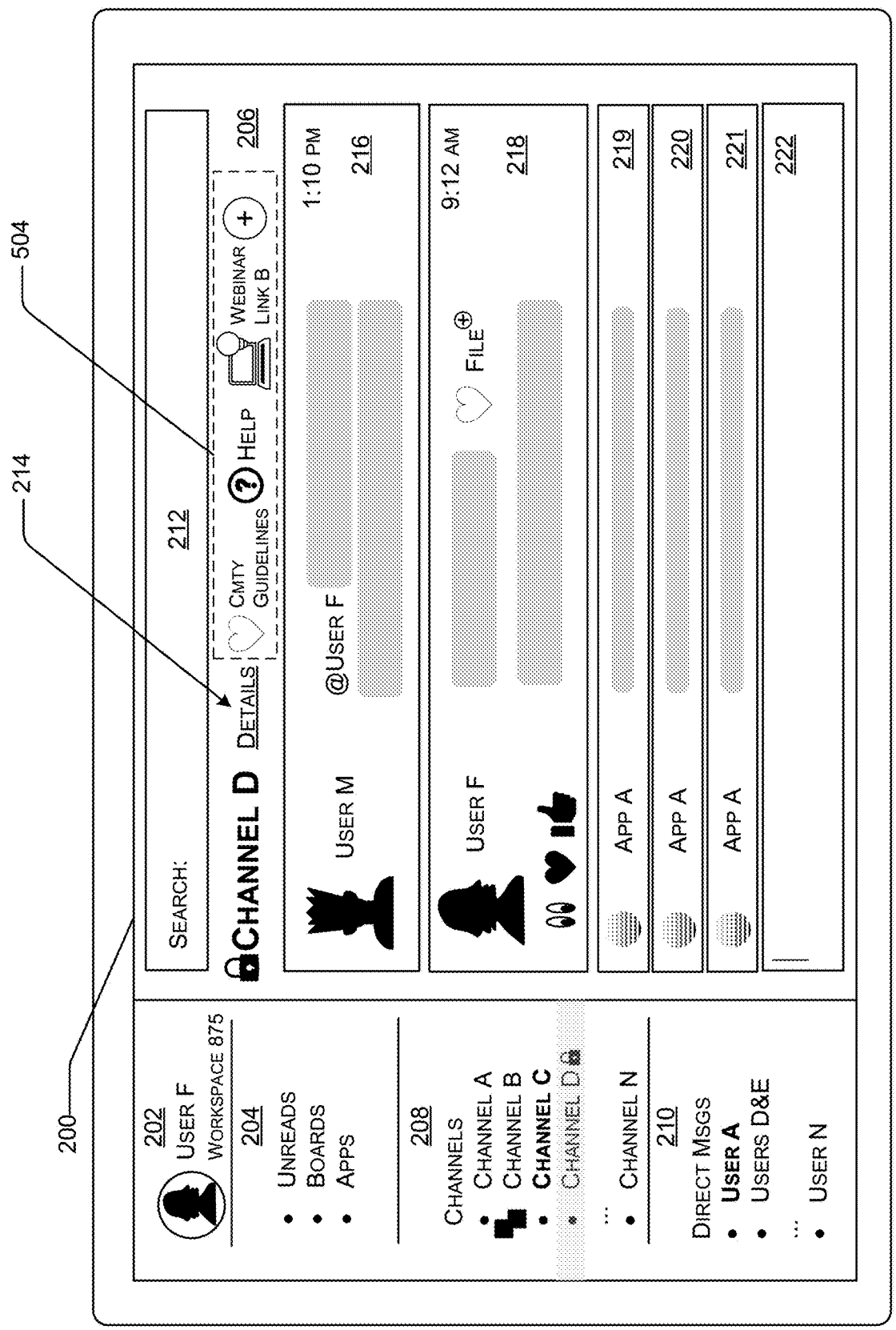

FIGS. 5A-5C illustrate other examples of user interfaces presented via a communication platform, as described herein. In some examples, as described below, an administrator can configure object interface templates for groups of users and/or types of virtual spaces. That is, in some examples, an administrator can programmatically control which object(s) are associated with an object interface of particular virtual space(s), based at least in part on type(s) of such virtual space(s) and/or group(s) of users associated therewith. In such examples, the object interface management component 116 can cause an administrator user interface to be presented via a user interface associated with the communication platform. In some examples, and as illustrated in FIG. 5A, the administrator user interface be presented via the second section 206 of the user interface 200. In some examples, the second section 206 of the user interface 200 can present user interface elements 500 that can be interactable to enable the administrator to design templates for users, groups (e.g., workspaces, organizations, etc.), types of virtual spaces (e.g., types of channels, direct messages, boards, etc.), and/or the like. That is, in at least one example, an administrator can interact with the administrator user interface to designate objects that are to be associated with an object interface for particular groups of users (e.g., workspaces, organizations, etc.) and/or types of virtual spaces (e.g., public channels, private channels, announcement channels, shared channels, direct messages, boards, etc.). Such configured object interfaces can comprise "templates" and can be stored in the datastore 122, as described below.

As such, when a user requests to access a virtual space associated with a templated object interface, the object interface management component 116 can determine which template is associated with the virtual space (e.g., for the type of the virtual space, the user, etc.) and can cause the corresponding object interface to be presented via the user interface 200. In some examples, the object interface management component 116 can access the user data 124, channel data 128, DM data 130, and/or the like, to determine data associated with the user and/or the virtual space. Such data can be used to determine whether a templated object interface is associated with the virtual space and which template to associate with the virtual space. For example, as illustrated in FIG. 5B, if the user (e.g., User F) is accessing the communication platform in association with a first workspace (e.g., Workspace 123), a first object interface 502 can be presented in association with the user interface 200. And, as illustrated in FIG. 5C, if the user (e.g., User F) is accessing the communication platform in association with a second workspace (e.g., Workspace 875), a second object interface 504 can be presented via the user interface 200. The first object interface 502 and the second object interface 504 can be associated with different objects, which can be particular to each workspace, channel, direct message, user, and/or the like.

FIGS. 1-5C make reference to "user interface elements." A user interface element can be any element of the user interface that is representative of an object, message, virtual space, and/or the like. A user interface element can be a text element, a graphical element, a picture, a logo, a symbol, and/or the like. In at least one example, individual of the user interface elements can be associated with actuation mechanisms. Such actuation mechanisms can make the corresponding user interface elements selectable. That is, actuation of an actuation mechanism as described herein can, in some examples, indicate a selection of a corresponding user interface element. In at least one example, the application 140 can receive an indication of an interaction with a user interface element (e.g., indication of a selection and/or actuation of an actuation mechanism) and can send an indication of such to the server(s) 102. In some examples, the server(s) 102 can send data and/or instructions to the application 140 to generate new user interfaces and/or update the user interface 200, as described herein.

The user interface 200 and variations described above are provided as a non-limiting example. Additional or alternative data can be presented via the user interface 200 and/or additional or alternative configurations of the data presented via the user interface 200 are within the scope of this disclosure.

FIGS. 6-9 are flowcharts showing example processes involving techniques as described herein. The processes illustrated in FIGS. 6-9 are described with reference to components described above with reference to the environment 100 shown in FIG. 1 and/or the user interface 200 described in FIGS. 2-5C for convenience and ease of understanding. However, the processes illustrated in FIGS. 6-9 are not limited to being performed using the components described above with reference to the environment 100 and/or the user interface 200. Moreover, the components described above with reference to the environment 100 and/or the user interface 200 are not limited to aspects described with respect to the processes illustrated in FIGS. 6-9.

The processes in FIGS. 6-9 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 6-9 can be combined in whole or in part with each other or with other processes.

Figure 6:
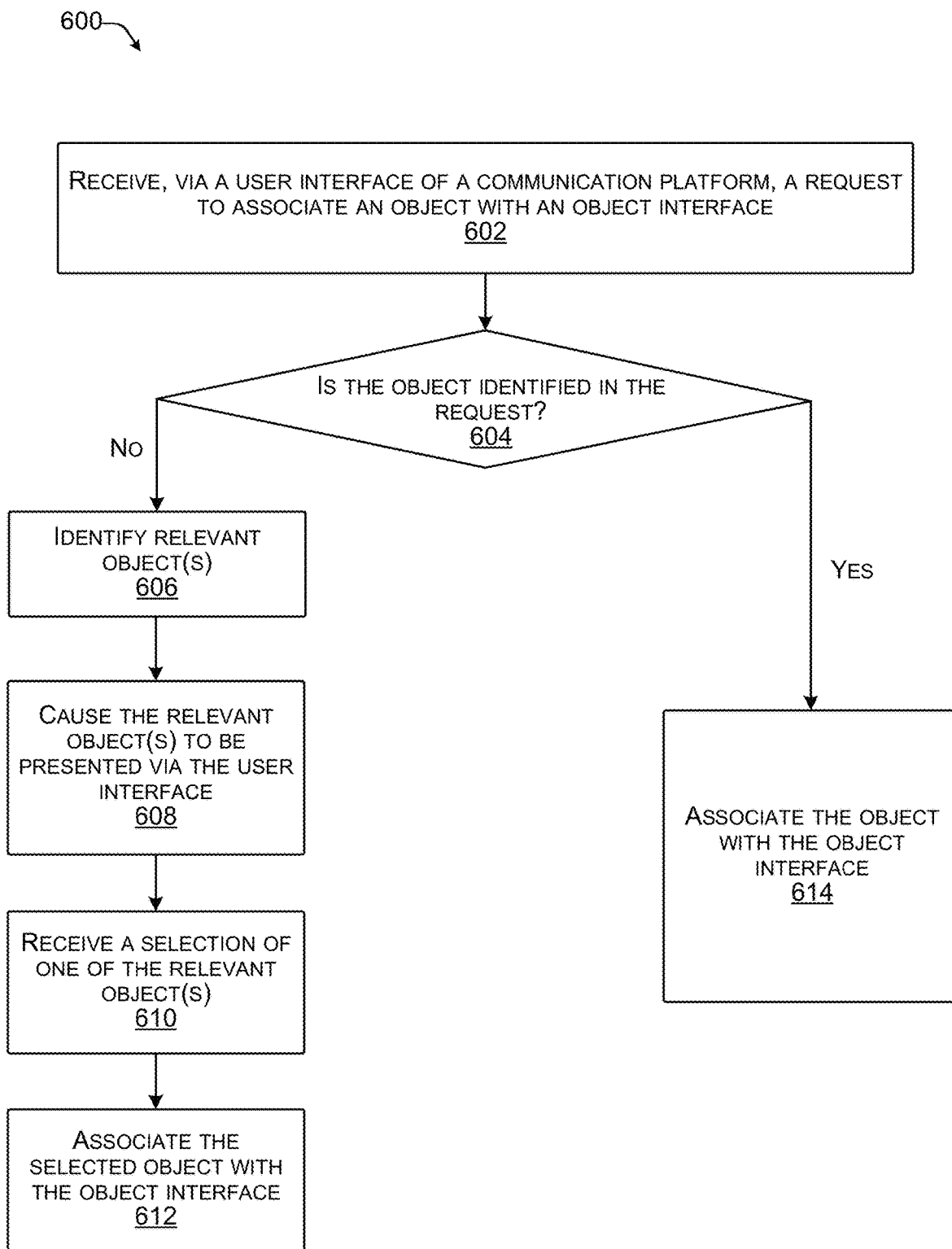
FIG. 6 illustrates an example process for associating an object with an object interface, as described herein.

FIG. 6 illustrates an example process 600 for associating an object with an object interface, as described herein.

At operation 602, the object interface management component 116 can receive, via a user interface 200 of a communication platform, a request to associate an object with an object interface. In at least one example, a user can interact with a user interface 200 of a communication platform to request to add an object to an object interface, an example of which is described above as the object interface 224. As described above, an object interface can be associated with one or more user interface elements representative of objects that have been "pinned" or otherwise associated with the object interface. By associating objects with the object interface, the user can quickly access such objects without scrolling or otherwise navigating through other data associated with the channel. In at least one example, an object can be text, an image, a video, a snippet of content, a user profile, a message, a file, a channel, a direct message, a board, a virtual space, an invitation, a sign-in request, a workflow, an application, and/or any other data item. In some examples, an object can be a "first-party object," which can be associated with the communication platform. In some examples, an object can be a "third-party object," such that the object is associated with a "third-party platform."

In at least one example, the object interface can be associated with a virtual space of the communication platform. That is, the object interface can be presented in association with the virtual space via the user interface. In some examples, the object interface can be presented in association with a header of the virtual space, as described above with reference to FIGS. 2 and 3A-3C. In some examples, the virtual space can comprise a channel, a direct message, a board, and/or the like. For example, the virtual space can be a public channel, a private channel, a shared channel, an announcement channel, a direct message, a board, or the like. In some examples, the virtual space can be associated with one or more "members" (e.g., users with permissions to access the virtual space and/or otherwise communicate or collaborate via the virtual space). In some examples, the member(s) can be associated with one or more groups (e.g., workspaces, organizations), such that the virtual space is "shared" (i.e., externally shared).

In at least one example, the object interface can be associated with a user interface element that enables the user to add an object to the object interface. That is, the user interface element can be associated with an actuation mechanism that, when actuated, enables selection of an object to be added to the object interface. An example of such a user interface element, the user interface element 228, is described above with reference to FIGS. 2-4I. In at least one example, the user interface 200 can be annotated with user interface elements that enable the user to add object(s) to the object interface. In some examples, such annotation(s) can comprise user interface element(s) that are proximate object(s) presented in a virtual space. In some examples, the user interface element(s) can be associated with actuation mechanism(s) that, when actuated, enable the association of corresponding objects to the object interface. In some examples, such annotation(s) can be based on permission(s) indicating which object(s), application(s), platform(s), etc. can be associated with an object interface. An example of such a user interface element, the user interface element 230, is described above with reference to FIGS. 2-4I.

In at least one example, the application 140 on the user computing device 104 of the user can detect an interaction with a user interface element as described above (e.g., a user interface element associated with the object interface and/or a user interface element proximate an object presented in a virtual space). Thus, based at least in part on the user actuating the actuation mechanism, the application 140 can detect the actuation and send an indication of the actuation to the server(s) 102. In some examples, such an indication can comprise a request (i.e., a request to add an object to the object interface). In some examples, the request can be associated with an identifier of the object (or not), a date of the request, a time of the request, an indication of a virtual space with which the request was originated from, and/or other context data associated with the request. In at least one example, the object interface management component 116 can receive the request.

At operation 604, the object interface management component 116 can determine whether the object is identified in the request. In at least one example, the object interface management component 116 can analyze the request to determine whether the request is associated with an object identifier.

At operation 606, if an object is not identified with the request (i.e., "no" at operation 604), the object interface management component 116 can identify relevant object(s). In some examples, the object interface management component 116 can identify one or more objects that are relevant to the user and/or the virtual space associated with the request. In some examples, the one or more identified objects can be objects associated with the virtual space with which the request is associated. That is, such "relevance" can be determined based at least in part on the objects being associated with the virtual space. In some examples, the one or more identified objects can be associated with the user with which the request is associated. That is, such "relevance" can be determined based at least in part on the objects being associated with the user. In some examples, such "relevance" can be determined based at least in part on interaction data. For example, the one or more identified objects can be determined to be associated with interaction(s) within a threshold period of time of receiving the request (e.g., objects with which the user and/or other users associated with the virtual space recently interacted with). In some examples, the one or more identified objects can be determined to be associated with frequency(s) above a threshold (e.g., objects with which the user or other users associated with the virtual space frequently interact with). In some examples, the one or more identified objects can be determined to be associated with interaction lengths above a threshold (e.g., objects with which the user or other users associated with the virtual space have interacted with for significant amounts of time).

In some examples, individual objects can be associated with a relevance metric indicating a relevance to the user and/or virtual space with which the request is associated. In at least one example, a relevance metric associated with an object can be determined, by the object interface management component 116, based at least in part on object data associated with the object (e.g., object type, virtual space(s) with which the object is associated, topic, content, etc.) and/or interaction data as described above. In some examples, the relevance metric can be determined using a machine-trained model, a statistical model, or the like. In at least one example, the object interface management component 116 can select one or more relevant object(s) to present for selection by the user. In some examples, there may be more relevant objects than there may be space on the user interface 200 for such objects. In such an example, the object interface management component 116 can select a set of relevant object(s) for presentation based at least in part on associated relevance metric(s).

At operation 608, the object interface management component 116 can cause the relevant object(s) to be presented via the user interface 200. In some examples, the relevant object(s) can be presented in association with a user interface element, as illustrated in FIG. 4B. In some examples, the user interface element presenting the relevant object(s) (e.g., user interface element(s) associated therewith) can be an object selection user interface for associating an object with the object interface. In at least one example, the object selection user interface can be presented as a pop-up, overlay, new user interface, portion of the user interface 200. In at least one example, the object selection user interface can include one or more additional user interface elements that can represent one or more objects that can be associated with the object interface. In some examples, the user interface elements representative of the relevant objects can be presented in an order of relevancy, which can be determined based at least in part on relevance metrics associated therewith. In at least one example, each of the additional user interface elements can be associated with an actuation mechanism that, when actuated, can cause the associated object to be associated with the object interface.

At operation 610, the object interface management component 116 can receive a selection of one of the relevant object(s). As described above, the object selection user interface can include actuation mechanisms that enable selection of object(s) to be associated with the object interface. In at least one example, the application 140 can detect actuation of an actuation mechanism associated with a user interface element corresponding to a particular object and can send an indication of such to the server(s) 102. The object interface management component 116 can receive the indication, which can include an identifier of the object, and can associate the object with the object interface, as illustrated at operation 612. In at least one example, the object interface management component 116 can associate the object with the object interface by mapping, or otherwise associating, an indication of the object (e.g., an object identifier) with an indication of the object interface (e.g., an object interface identifier). Such a mapping or other association can be stored in the datastore 122.

In some examples, the user can interact with the object selection user interface to provide a name associated with the object as it is to appear in the object interface. In some examples, the object interface management component 116 can determine a default name for the object based at least in part on object data associated with the object. In some examples, the user can provide a name for the object via the object selection user interface.

At operation 614, based at least in part on the request including an identifier of the object (i.e., "yes" at operation 604), the object interface management component 116 can associate the object with the object interface. As described above, in some examples, the communication platform can annotate the user interface 200 with user interface elements to indicate when object(s) can be associated with the object interface. In some examples, an object that can be associated with the object interface can be associated with a user interface element that enables the user to add the object to the object interface. For example, such a user interface element can be associated with an actuation mechanism that, when actuated, can enable the user to add the object to the object interface. In such an example, the request to associate the object with the object interface can include an identifier of the object. As such, based at least in part on the request including an identifier of the object, the object interface management component 116 can associate the object with the object interface, as illustrated at operation 614, without further prompting the user to select or otherwise identify an object for such association. In some examples, as described above with reference to FIG. 4D, the object interface management component 116 can request that the user confirm the association of the object with the object interface. In some examples, the user can provide a name of the object in association with the confirmation.

In at least one example, based at least in part on associating an object with the object interface, as illustrated at operations 612 and/or 614, the object interface management component 116 can cause a user interface element representative of the object to be presented via the object interface in association with the virtual space with which the object interface is associated. In some examples, the object interface management component 116 can send updates to each of the users associated with the virtual space. That is, the object interface management component 116 can cause the user interface element representative of the object to be presented via each instance of the user interface presented via user computing devices of users associated with the virtual space. For example, if the virtual space is a channel, instances of the user interface presented to each member of the channel can be updated to include the user interface element representative of the object in the object interface associated with the channel. In some examples, such an update can be pushed to the user computing devices in real-time, or within a threshold amount of time of when the request to associate the object with the object interface is received.

Figure 7:
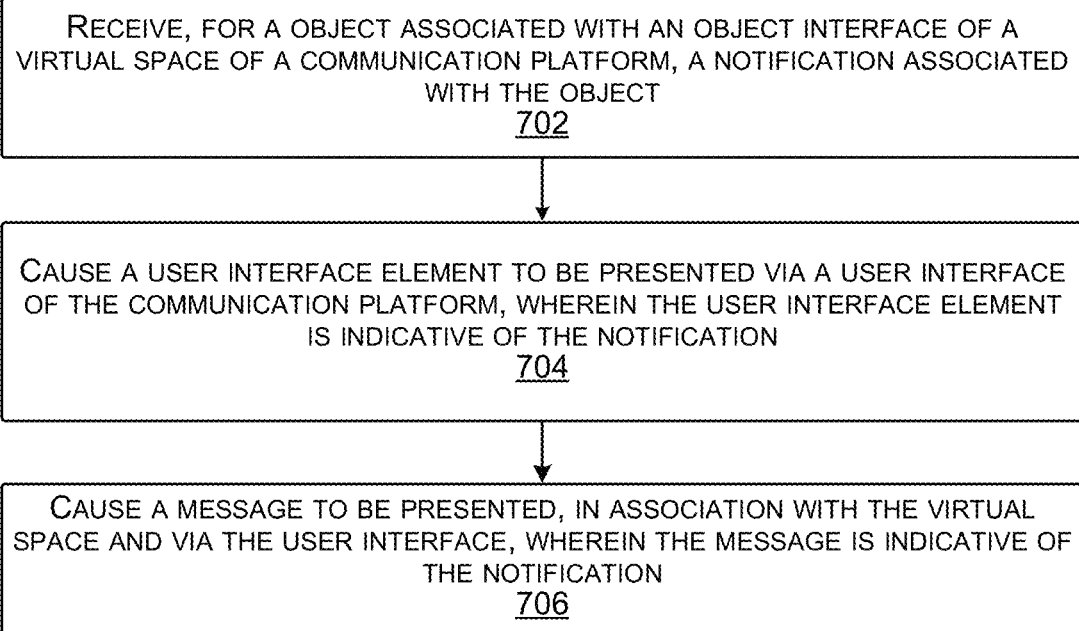
FIG. 7 illustrates an example process for annotating a user interface based at least in part on notification(s) associated with object(s) that are associated with an object interface, as described herein.

FIG. 7 illustrates an example process 700 for annotating a user interface based at least in part on notification(s) associated with object(s) associated with the object interface, as described herein.

At operation 702, the object interface management component 116 can receive, for an object associated with an object interface of a virtual space of a communication platform, a notification associated with the object. In some examples, the notification can indicate a modification to the object, wherein the modification can comprise an edit to content associated with the document or the like. In some examples, the notification can indicate an interaction associated with the object, wherein the interaction can comprise a changed permission associated with the object, a change to current users interacting with the object, or the like. In at least one example, the object interface management component 116 can receive notifications associated with objects that are associated with object interfaces. In some examples, the object interface management component 116 can pull notifications from objects, such that the object interface management component 116 can send a request for a status of an object and receive a notification in response to sending the request. In some examples, the object interface management component 116 can receive notifications without having first sent a request. That is, in some examples, objects can push notifications to the object interface management component 116.

In some examples, the object interface management component 116 can subscribe to notifications associated with objects. In such examples, Additional details associated with such subscriptions are provided in U.S. patent application Ser. No. 17/163,017, filed on Jan. 29, 2021, the entire contents of which are incorporated by reference herein.

In some examples, notifications can be received via an API. For example, the communication platform can provide API(s) for third-party platforms to integrate with the communication platform. In some examples, the API(s) can enable third-party platforms to enable communications, such as notifications, and designate preferences with respect to the types of modifications and/or interactions that will prompt a notification, the frequency with which notifications are sent, how such notifications are presented via the user interface 200, and/or the like. As such, in some examples, a notification associated with an object can be received via an API.

At operation 704, the object interface management component 116 can cause a user interface element to be presented via the user interface of the communication platform, wherein the user interface element is indicative of the notification. In at least one example, based at least in part on receiving the notification, the object interface management component 116 can cause a user interface element to be presented via the user interface 200. In some examples, the user interface element, which can be a badge or the like, can be associated with a user interface element representative of the object in the object interface. In some examples, the user interface element can be associated with a count indicating a number of notifications that have been received in association with the object in a period of time or since the user last viewed the object. An example of such a user interface element is illustrated in FIG. 4H above.

At operation 706, the object interface management component 116 can cause a message to be presented in association with the virtual space and via the user interface, wherein the message is indicative of the notification. In some examples, based at least in part on receiving the indication of the notification, the object interface management component 116 can cause a message to be presented via the user interface 200, for example in a feed associated with the virtual space. That is, in at least one example, a message associated with the notification can be presented in the second section 206 of the user interface 200. In some examples, the message (e.g., a user interface element associated therewith) can be presented via the user interface 200 instead of, or in addition to, the user interface element being presented as described above with reference to operation 704.

In at least one example, operations 704 and/or 706 can comprise "annotating" the user interface in response to receiving a notification, as described below.

Figure 8:
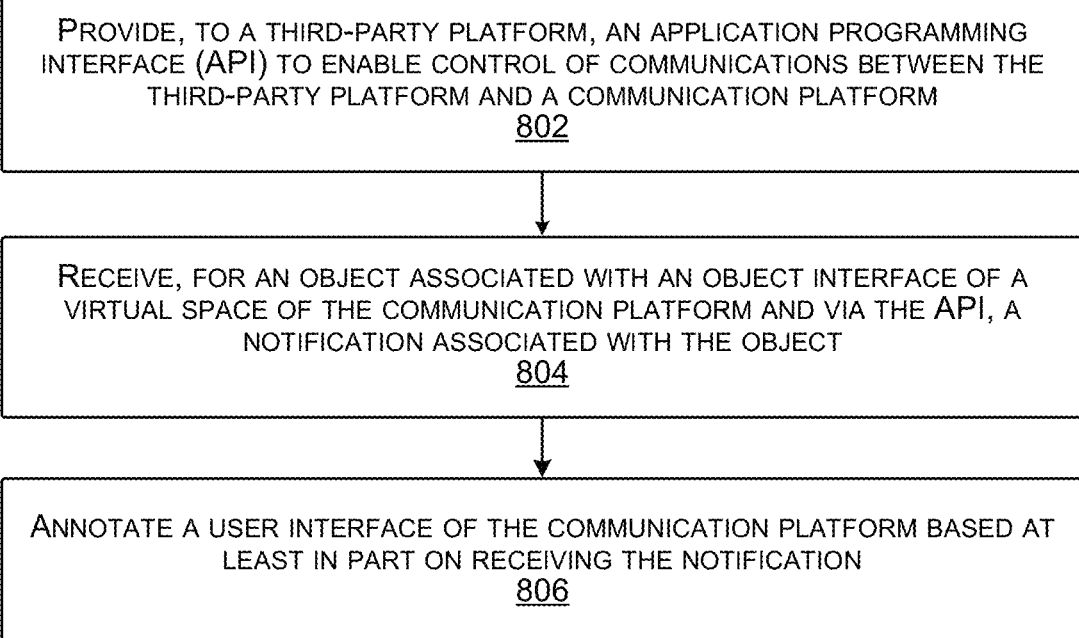
FIG. 8 illustrates an example process for providing an application programming interface (API) to enable interaction between a communication platform and a third-party platform and annotating a user interface based at least in part on notification(s) associated with object(s) received via the API, as described herein.

FIG. 8 illustrates an example process 800 for providing an application programming interface (API) to enable third-party control of communications between a communication platform and a third-party platform and annotating a user interface based at least in part on modification(s) of object(s) received via the API, as described herein.

At operation 802, the communication platform can provide, to a third-party platform, an application programming interface (API) to enable control of communications between the third-party platform and the communication platform. In some examples, as described above, the communication platform can provide API(s) for third-party platforms to integrate with the communication platform. In some examples, the API(s) can enable third-party platforms to provide input with respect to notifications and/or other communications, such as the types of modifications and/or interactions that will prompt a notification, the frequency with which notifications are sent, how such notifications are presented via the user interface 200, and/or the like. In some examples, the API(s) can define the kinds of communications (e.g., calls or requests) that can be made, how to make them, the data formats that should be used, conventions to follow, and/or the like.

At operation 804, the object interface management component 116 can receive, for an object associated with an object interface of a virtual space of the communication platform and via the API, a notification associated with the object, as described above with reference to operation 702 of FIG. 7.

At operation 806, the object interface management component 116 can annotate a user interface 200 of the communication platform based at least in part on receiving the notification. As described above with reference to operations 704 and 706, in at least one example, the object interface management component 116 can cause a user interface element representative of the modification or the interaction to be presented via the user interface 200. In some examples, the user interface element can be a badge or the like, which can be associated with a user interface element representative of the object in the object interface. In some examples, the user interface element can be a message presented in a feed of the virtual space with which the object interface is associated. In some examples, the object interface management component 116 can cause a pop-up, overlay, or other user interface element to be presented via the user interface in response to receiving a notification or other indication of an update to an object. In some examples, such a pop-up, overlay, or other user interface element can be ephemeral (e.g., short-lived or transitory).

Figure 9:
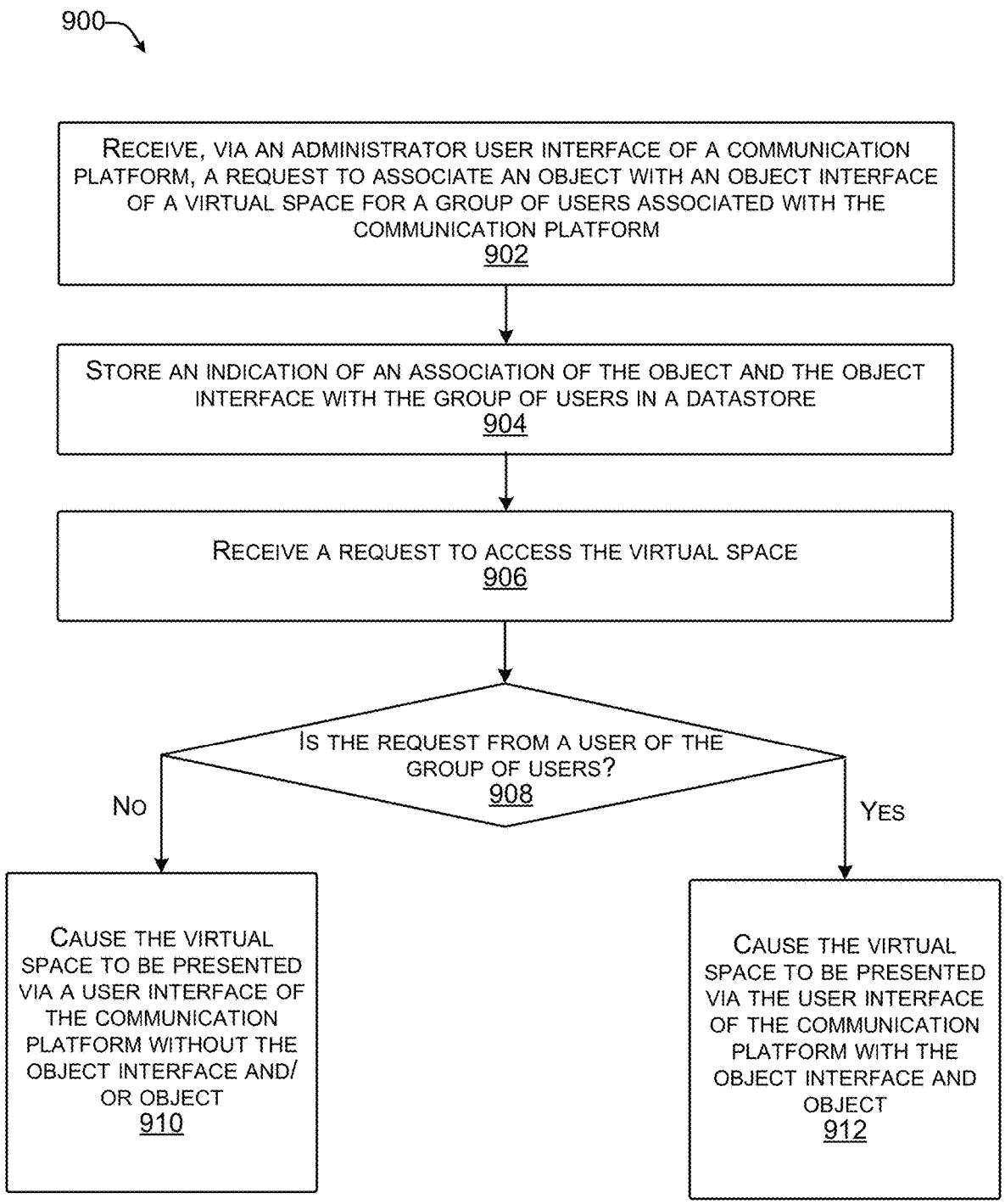
FIG. 9 illustrates an example process for generating an object interface template for a group of users associated with a communication platform, as described herein.

FIG. 9 illustrates an example process 900 for generating an object interface template for a group of users associated with a communication platform, as described herein.

At operation 902, the object interface management component 116 can receive, via an administrator user interface of a communication platform, a request to associate an object with an object interface of a virtual space for a group of users associated with the communication platform. As described above with reference to FIG. 5A, in some examples, an administrator can configure object interface templates for groups of users and/or types of virtual spaces. In such examples, the object interface management component 116 can cause an administrator user interface to be presented via a user interface 200 associated with the communication platform. In some examples, the second section 206 of the user interface 200 can present user interface elements 500 that can be interactable to enable the administrator to design templates for users, groups (e.g., workspaces, organizations, etc.), types of virtual spaces (e.g., types of channels, direct messages, boards, etc.), and/or the like. That is, in at least one example, an administrator can interact with the administrator user interface to designate objects that are to be associated with an object interface of a virtual space for particular groups of users (e.g., workspaces, organizations, etc.). In at least one example, an administrator can request to associate an object with an object interface of a virtual space and can indicate a group of users with which such an object and object interface is to be presented. In some examples, the object, object interface, and group of users can each be associated with identifiers.

At operation 904, the object interface management component 116 can store an indication of an association of the object and the object interface with the group of users in a datastore 122 of the communication platform. In at least one example, based at least in part on receiving a request to associate the object with the object interface of the virtual space for the group of users, the object interface management component 116 can map or otherwise associate the object and object user interface of the virtual space with the group of users in the datastore 122. In some examples, such a mapping or other association can be accomplished by mapping the object identifier to the object interface identifier, which can be mapped to an identifier of the virtual space, and mapping the object interface identifier with a group identifier of the group of users.

At operation 906, the object interface management component 116 can receive a request to access the virtual space. In at least one example, a user can request to access the virtual space. In some examples, such a request can be received via the user interface 200. The application 140 can send an indication of the request to the server(s) 102. In some examples, the channel management component 118, the direct message management component 119, a board management component, and/or the like can receive the request and can forward the request to the object interface management component 116 (e.g., as a query whether a particular object interface is associated with the virtual space for the requesting user). In some examples, the request can include an identifier associated with the user and/or the virtual space. Using the identifier associated with the user, the object interface management component 116 can access user data associated with the user to determine whether the user is associated with one or more group identifiers. Based on such a determination, the object interface management component 116 can determine whether the request is from a user of the group of users, as illustrated at operation 908.

At operation 910, based at least in part on the request not being from a user of the group of users (i.e., "no" at operation 908), the object interface management component 116 can cause the virtual space to be presented via a user interface 200 of the communication platform without the object interface and/or object. In at least one example, if the request is from a user that is not associated with the group identifier of the group of users, the object interface management component 116 can cause the virtual space to be presented via the user interface 200 without the object interface and object. In some examples, another object interface and/or object may be associated with the group identifier with which the requesting user is associated.

At operation 912, based at least in part on the request being from a user of the group of users (i.e., "yes" at operation 912), the object interface management component 116 can cause the virtual space to be presented via the user interface 200 of the communication platform with the object interface and object. In at least one example, if the request is from a user that is associated with the group identifier of the group of users, the object interface management component 116 can cause the virtual space to be presented via the user interface 200 with the object interface and object. In such examples, the object interface can be a template of sorts such that the object interface, with the object, can be presented in association with the virtual space when each user associated with the group of users accesses the virtual space.

As described above, an administrator can generate templates of object interfaces for different groups of users. Similarly, an administrator can generate templates of object interfaces for different types of virtual spaces for groups of users. For example, an announcement channel associated with an organization can be associated with a first object interface and a private channel associated with the organization can be associated with a second object interface that includes additional or alternative objects than the first object interface.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

A. A method comprising: receiving, in association with a user interface of a group-based communication platform, a request to associate an object with an object interface associated with a virtual space of the group-based communication platform; causing one or more objects associated with the group-based communication platform to be presented via the user interface; receiving, via the user interface, a selection of a particular object from the one or more objects; causing, in response to the selection, a first user interface element representative of the particular object to be associated with the object interface, wherein the first user interface element is associated with an actuation mechanism that, when actuated, causes the particular object to be presented via the user interface; receiving a notification associated with the particular object; and causing, within a threshold period of time from receiving the notification, a second user interface element to be presented via the user interface, wherein the second user interface element is associated with at least one of the first user interface element or a message presented via the virtual space.

B. The method of paragraph A, wherein the virtual space comprises a channel, a direct message, or a board.

C. The method of paragraph B, wherein the virtual space is associated with two or more different organizations.

D. The method of any of claims A-C, wherein at least one of the one or more objects is associated with a third-party application with which the group-based communication platform is in communication.

E. The method of any of claims A-D, further comprising generating the one or more objects based at least in part on identifying the one or more objects that have been accessed, in association with the virtual space, within a threshold period of time.

F. The method of any of claims A-E, further comprising generating the one or more objects based at least in part on a determination that the one or more objects are relevant to at least one of a requesting user or the virtual space.

G. The method of any of claims A-F, wherein the first user interface element is viewable to each member associated with the virtual space.

H. The method of any of claims A-G, wherein the first user interface element is one of a plurality of user interface elements representative of a plurality of objects associated with the object interface, and wherein an arrangement of the plurality of user interface elements is configurable by a user associated with the virtual space.

I. The method of any of claims A-H, wherein the object interface is associated with a header of the virtual space.

J. The method of any of claims A-I, wherein the object interface is associated with a third user interface element, and wherein the third user interface element is associated with an actuation mechanism that, when actuated, enables the object interface to be shared with one or more other virtual spaces of the group-based communication platform.

K. A system comprising: one or more processors; and one or more non-transitory computer-readable media storing instructions that, when executed by the one or more processors, cause the system to perform operations comprising: receiving, in association with a user interface of a group-based communication platform, a request to associate an object with an object interface associated with a virtual space of the group-based communication platform; causing one or more objects associated with the group-based communication platform to be presented via the user interface; receiving, via the user interface, a selection of a particular object from the one or more objects; causing, in response to the selection, a first user interface element representative of the particular object to be associated with the object interface, wherein the first user interface element is associated with an actuation mechanism that, when actuated, causes the particular object to be presented via the user interface; receiving a notification associated with the particular object; and causing, within a threshold period of time from receiving the notification, a second user interface element to be presented via the user interface, wherein the second user interface element is associated with at least one of the first user interface element or a message presented via the virtual space.

L. The system of paragraph K, the operations further comprising generating the one or more objects based at least in part on identifying the one or more objects that have been accessed, in association with the virtual space, within a threshold period of time.

M. The system of paragraph K or L, the operations further comprising generating the one or more objects based at least in part on a determination that the one or more objects are relevant to at least one of a requesting user or the virtual space.

N. The system of any of claims K-M, wherein the first user interface element is one of a plurality of user interface elements representative of a plurality of objects associated with the object interface, and wherein an arrangement of the plurality of user interface elements is configurable by a user associated with the virtual space.

O. The system of any of claims K-N, wherein the object interface is associated with a third user interface element, and wherein the third user interface element is associated with an actuation mechanism that, when actuated, enables the object interface to be shared with one or more other virtual spaces of the group-based communication platform.

P. One or more non-transitory computer-readable media storing instructions that, when executed by one or more processors, cause the one or more processors to perform operations comprising: receiving, in association with a user interface of a group-based communication platform, a request to associate an object with an object interface associated with a virtual space of the group-based communication platform; causing one or more objects associated with the group-based communication platform to be presented via the user interface; receiving, via the user interface, a selection of a particular object from the one or more objects; causing, in response to the selection, a first user interface element representative of the particular object to be associated with the object interface, wherein the first user interface element is associated with an actuation mechanism that, when actuated, causes the particular object to be presented via the user interface; receiving a notification associated with the particular object; and causing, within a threshold period of time from receiving the notification, a second user interface element to be presented via the user interface, wherein the second user interface element is associated with at least one of the first user interface element or a message presented via the virtual space.

Q. The one or more non-transitory computer-readable media of paragraph P, the operations further comprising generating the one or more objects based at least in part on identifying the one or more objects that have been accessed, in association with the virtual space, within a threshold period of time.

R. The one or more non-transitory computer-readable media of paragraph P or Q, the operations further comprising generating the one or more objects based at least in part on a determination that the one or more objects are relevant to at least one of a requesting user or the virtual space.

S. The one or more non-transitory computer-readable media of any of claims P-R, wherein the object interface is associated with a header of the virtual space and wherein the first user interface element is viewable to each member associated with the virtual space.

T. The one or more non-transitory computer-readable media of any of claims P-S, wherein the object interface is associated with a third user interface element, and wherein the third user interface element is associated with an actuation mechanism that, when actuated, enables the object interface to be shared with one or more other virtual spaces of the group-based communication platform.

While the paragraphs above are described with respect to one particular implementation, it should be understood that, in the context of this document, the content of the paragraphs above can also be implemented via a method, device, system, a computer-readable medium, and/or another implementation. Additionally, any of paragraphs A-T may be implemented alone or in combination with any other one or more of the paragraphs A-T.

What is claimed is:

1. A method, implemented at least in part by one or more computing devices of a communication platform, the method comprising:

receiving, via an administrator user interface of the communication platform, a first request to associate at least one object of a plurality of objects with an object interface of a virtual space, wherein the object interface is different from the virtual space, represented by a portion of a user interface of the communication platform, comprises a plurality of user interface elements representing those objects of the plurality of objects associated with the object interface; and the first request indicating:
  an administrator designation,
  an association of the at least one object of a plurality of objects with the object interface as a first association, and
  an association of the object interface with a group identifier as a second association, wherein the group identifier identifies a group of users of the communication platform;
identifying, based at least in part on the first request and the administrator designation, a relevance metric associated with the plurality of objects, the relevance metric indicating at least one of a relevance of the plurality of objects to the group of users or a relevance of the plurality of objects to the virtual space;
identifying, based at least in part on the relevance metric, at least one relevant object of the plurality of objects;
storing, based at least in part on the relevance metric, an association of the at least one relevant object with the second association of the object interface and the group identifier, wherein storing the association associates, as a stored association, the at least one relevant object with the group of users in the communication platform;
receiving, from a client device associated with a user account of a user of the communication platform, a second request to access the virtual space;
determining, based at least in part on the second request, that the user is included in the group of users;
accessing, based at least in part on the user being included in the group of users, the object interface and the stored association of the at least one relevant object and the object interface; and
causing, via a user interface of the communication platform, display of the virtual space with the object interface that includes the user interface element representing the at least one relevant object.

2. The method of claim 1, wherein the object interface is a first object interface and the virtual space is a first virtual space, further comprising:
  receiving, from the client device, a third request to access a second virtual space; and
  causing, via the user interface, display of the second virtual space with a second object interface that is different from the first object interface.

3. The method of claim 1, wherein the object interface is a template interface associated with the group of users.

4. The method of claim 1, wherein accessing the object interface is based at least in part on:
  identifying, based at least in part on the first request, a user identifier associated with the user;
  determining that the user identifier is associated with a group identifier associated with the group of users; and
  determining that the group identifier is mapped to an object interface identifier associated with the object interface.

5. The method of claim 1, wherein the administrator user interface generates an object interface template for at least one of:
  one or more groups of users, or
  one or more types of virtual spaces.

6. The method of claim 1, wherein the object interface comprises one or more selectable user interface elements that reference one or more objects associated with content related to the virtual space.

7. The method of claim 1, wherein the virtual space comprises a channel, a direct message, or a board.

8. The method of claim 1, wherein the object interface is associated with a header of the virtual space.

9. A system comprising:
  one or more processors; and
  one or more non-transitory computer-readable media storing instructions that, when executed by the one or more processors, cause the system to perform operations comprising:
    receiving, via an administrator user interface of a communication platform, a first request to associate at least one object of a plurality of objects with an object interface of a virtual space, wherein the object interface is different from the virtual space, represented by a portion of a user interface of the communication platform, comprises a plurality of user interface elements representing those objects of the plurality of objects associated with the object interface; and the first request indicating:
      an administrator designation,
      an association of the at least one object of a plurality of objects with the object interface as a first association, and
      an association of the object interface with a group identifier as a second association, wherein the group identifier identifies a group of users of the communication platform;
    identifying, based at least in part on the first request, a relevance metric associated with the plurality of objects, the relevance metric indicating at least one of a relevance of the plurality of objects to the group of users or a relevance of the plurality of objects to the virtual space;
    identifying, based at least in part on the relevance metric and the administrator designation, at least one relevant object of the plurality of objects;
    storing, as a stored association based at least in part on the relevance metric, an association of the at least one relevant object with the second association of the object interface and the group identifier, wherein storing the association associates the at least one relevant object with the group of users in the communication platform;
    receiving, from a client device associated with a user account of a user of the communication platform, a second request to access the virtual space;
    determining, based at least in part on the second request, that the user is included in the group of users;
    accessing, based at least in part on the user being included in the group of users, the object interface and the stored association of the at least one relevant object and the object interface; and
    causing, via a user interface of the communication platform, display of the virtual space with the object interface that includes the user interface element representing the at least one relevant object.

10. The system of claim 9, wherein the object interface is a first object interface and the virtual space is a first virtual space, the operations further comprising:
  receiving, from the client device, a third request to access a second virtual space; and
  causing, via the user interface, display of the second virtual space with a second object interface that is different from the first object interface.

11. The system of claim 9, wherein the object interface is a template interface associated with the group of users.

12. The system of claim 9, wherein accessing the object interface is based at least in part on:
identifying, based at least in part on the first request, a user identifier associated with the user;
determining that the user identifier is associated with a group identifier associated with the group of users; and
determining that the group identifier is mapped to an object identifier associated with the object identifier.

13. The system of claim 9, wherein the administrator user interface generates an object interface template for at least one of:
one or more groups of users, or
one or more types of virtual spaces.

14. The system of claim 9, wherein the object interface comprises one or more selectable user interface elements that reference one or more objects associated with content related to the virtual space.

15. One or more non-transitory computer-readable media storing instructions that, when executed, cause one or more processors to:
receiving, via an administrator user interface of a communication platform, a first request to associate at least one object of a plurality of objects with an object interface of a virtual space, wherein the object interface is different from the virtual space, represented by a portion of a user interface of the communication platform, comprises a plurality of user interface elements representing those objects of the plurality of objects associated with the object interface; and the first request indicating:
an administrator designation,
an association of the at least one object of a plurality of objects with the object interface as a first association, and
an association of the object interface with a group identifier as a second association, wherein the group identifier identifies a group of users of the communication platform;
identifying, based at least in part on the first request and the administrator designation, a relevance metric associated with the plurality of objects, the relevance metric indicating at least one of a relevance of the plurality of objects to the group of users or a relevance of the plurality of objects to the virtual space;
identifying, based at least in part on the relevance metric, at least one relevant object of the plurality of objects;
storing, as a stored association based at least in part on the relevance metric, an association of the at least one relevant object with the second association of the object interface and the group identifier, wherein storing the association associates the at least one relevant object with the group of users in the communication platform;
receiving, from a client device associated with a user account of a user of the communication platform, a second request to access the virtual space;
determining, based at least in part on the second request, that the user is included in the group of users;
accessing, based at least in part on the user being included in the group of users, the object interface and the stored association of the at least one relevant object and the object interface; and
causing, via a user interface of the communication platform, display of the virtual space with the object interface that includes the user interface element representing the at least one relevant object.

16. The one or more non-transitory computer-readable media of claim 15, wherein the object interface is a first object interface and the virtual space is a first virtual space, further comprising:
receiving, from the client device, a third request to access a second virtual space; and
causing, via the user interface, display of the second virtual space with a second object interface that is different from the first object interface.

17. The one or more non-transitory computer-readable media of claim 15, wherein the object interface is a template interface associated with the group of users.

18. The one or more non-transitory computer-readable media of claim 15, wherein accessing the object interface is based at least in part on:
identifying, based at least in part on the first request, a user identifier associated with the user;
determining that the user identifier is associated with a group identifier associated with the group of users; and
determining that the group identifier is mapped to an object identifier associated with the object identifier.

19. The one or more non-transitory computer-readable media of claim 15, wherein the administrator user interface generates an object interface template for at least one of:
one or more groups of users, or
one or more types of virtual spaces.

20. The one or more non-transitory computer-readable media of claim 15, wherein the object interface comprises one or more selectable user interface elements that reference one or more objects associated with content related to the virtual space.

* * * * *